(12) United States Patent
Danielson et al.

(10) Patent No.: US 11,584,341 B2
(45) Date of Patent: Feb. 21, 2023

(54) SYSTEM AND METHOD FOR WHEEL-SLIP PREVENTION IN RAILWAY VEHICLES WITH PNEUMATIC BRAKES

(71) Applicant: Mitsubishi Electric Research Laboratories, Inc., Cambridge, MA (US)

(72) Inventors: Claus Danielson, Somerville, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 444 days.

(21) Appl. No.: 16/737,169

(22) Filed: Jan. 8, 2020

(65) Prior Publication Data
US 2021/0206358 A1 Jul. 8, 2021

(51) Int. Cl.
| | | |
|---|---|---|
| *B60T 8/17* | (2006.01) | |
| *B60T 8/175* | (2006.01) | |
| *B60T 8/176* | (2006.01) | |
| *B60T 8/32* | (2006.01) | |
| *B60T 13/36* | (2006.01) | |
| *B61H 13/34* | (2006.01) | |

(52) U.S. Cl.
CPC ............ *B60T 8/1705* (2013.01); *B60T 8/175* (2013.01); *B60T 8/176* (2013.01); *B60T 8/3235* (2013.01); *B60T 13/365* (2013.01); *B61H 13/34* (2013.01); *B60T 2240/00* (2013.01); *B60T 2270/10* (2013.01); *B60T 2270/14* (2013.01); *B60T 2270/20* (2013.01); *B60T 2270/308* (2013.01)

(58) Field of Classification Search
CPC ........ B60T 8/1705; B60T 8/175; B60T 8/176; B60T 8/3235; B60T 13/365; B60T 2240/00; B60T 2240/10; B60T 2240/14; B60T 2240/20; B60T 2240/308; B61H 13/34
See application file for complete search history.

(56) References Cited

U.S. PATENT DOCUMENTS

| | | | | |
|---|---|---|---|---|
| 2002/0088673 A1* | 7/2002 | Malac | ................... | B60T 8/1705 188/1.11 R |
| 2015/0294049 A1* | 10/2015 | Kang | ................... | B60T 17/228 703/2 |

* cited by examiner

*Primary Examiner* — James M McPherson
*Assistant Examiner* — Bakari Underwood
(74) *Attorney, Agent, or Firm* — Gennadiy Vinokur; Hironori Tsukamoto

(57) ABSTRACT

A control system for wheel-slip prevention in a railway vehicle with a pneumatic brake is provided. The control system comprises an input interface configured to accept a deceleration reference for controlling the pneumatic brake, and a memory configured to store a reference governor providing executable instructions for modifying the deceleration reference upon its violation of a wheel-slip constraint, and configured to store a controller providing executable instructions for mapping the modified deceleration reference to a sequence of control commands for controlling pressure applied by the pneumatic brake. The control system further comprises a processor configured to execute the reference governor to modify the deceleration reference and configured to execute the controller to map the modified deceleration reference to the sequence of control commands. Further, an output interface of the control system is configured to output the sequence of control commands to control the pneumatic brake.

16 Claims, 18 Drawing Sheets

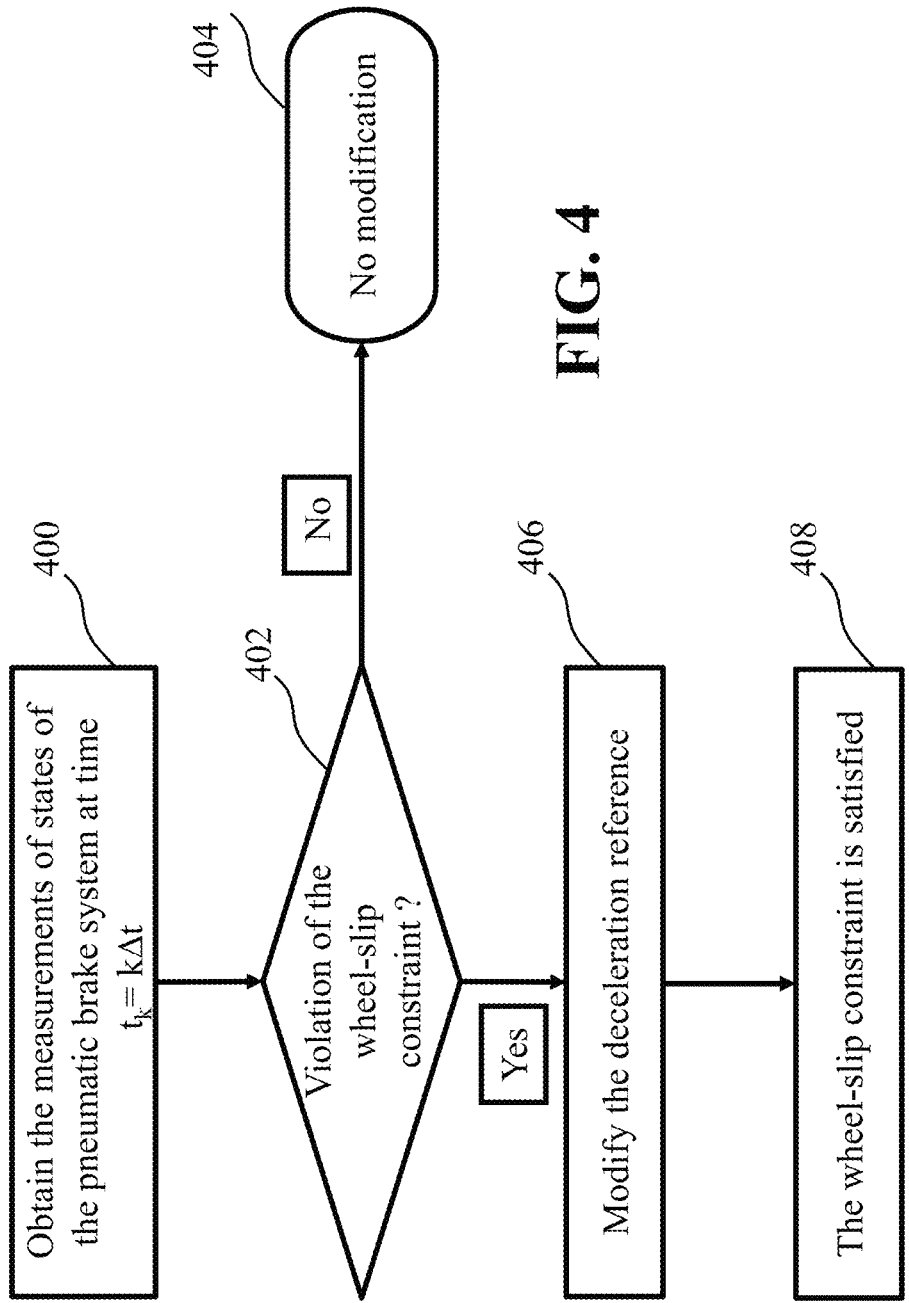

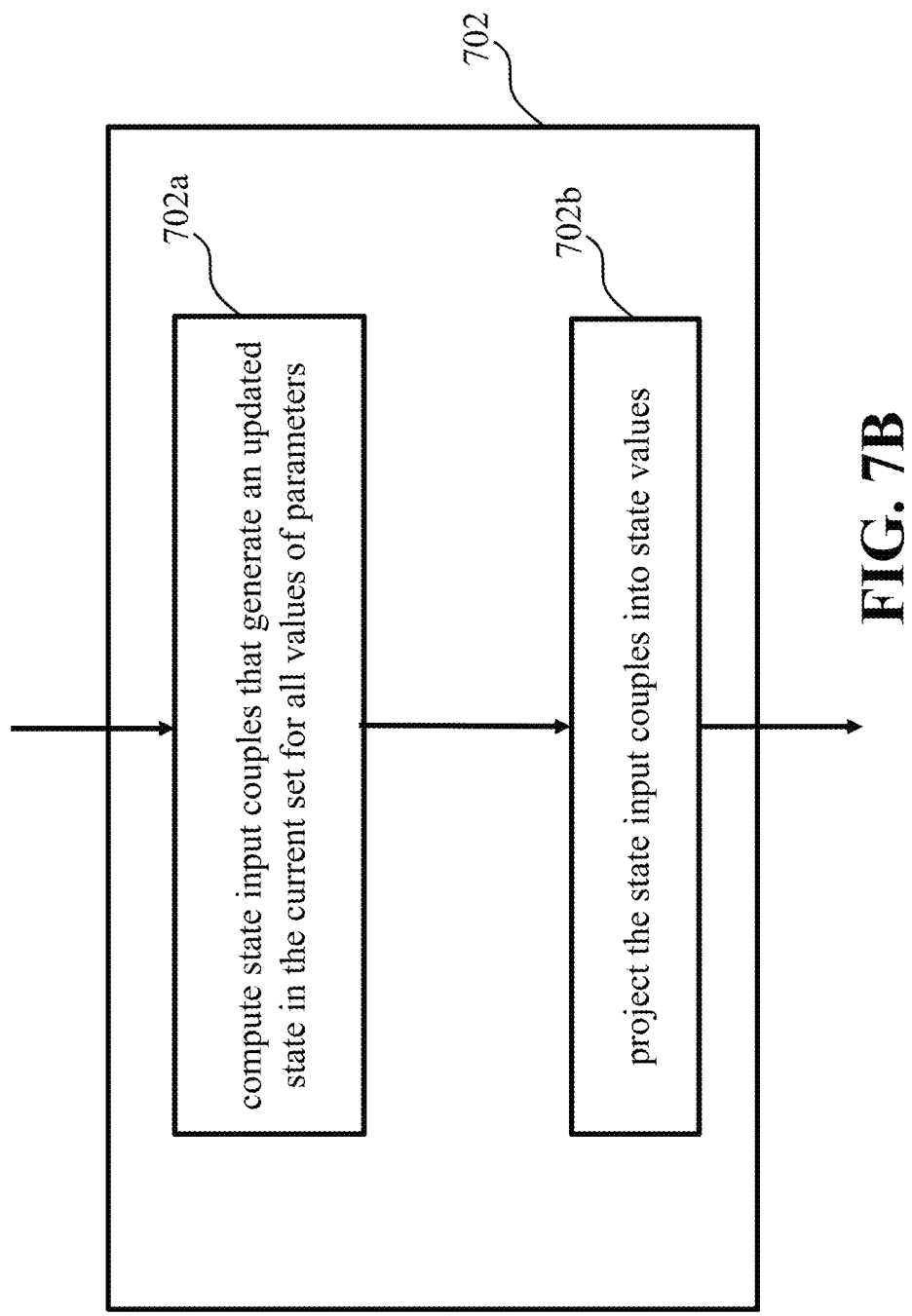

SYSTEM AND METHOD FOR WHEEL-SLIP PREVENTION IN RAILWAY VEHICLES WITH PNEUMATIC BRAKES

TECHNICAL FIELD

This invention relates generally to control of brake systems, and more particularly to system and method for wheel-slip prevention in railway vehicles with pneumatic brakes.

BACKGROUND

Railway vehicles utilize pneumatic-brakes to stop or decelerate the railway vehicles. A stopping force needed to stop the vehicle is generated by filling a brake-cylinder with compressed air and pressing on a piston to apply pressure to brake pad. The filling of the brake-cylinder is controlled by an integrated control system which adjusts brake-cylinder pressure and consequently braking-torque to achieve desired deceleration.

The stopping force produced is a non-linear function of the wheel-slip speed. For small slip-speeds, the stopping force increases with increase in the slip-speed. For large slip-speeds, the stopping force decreases with increase in the slip-speed. Therefore, regulating wheel-slip is important for preventing excessive wheel-slip and controlling speed of the railway vehicle. Two automotive examples of regulating wheel-slip are anti-lock brakes and traction control systems.

Due to slow dynamics and non-linear hysteresis behavior of the pneumatic-brakes, the automotive controllers, such as anti-lock brake and traction control systems, cannot be applied to the pneumatic-brakes. Some pneumatic-brakes employ a slip protection system to halt excessive slip. The slip protection system vents air from the brake-cylinder to rapidly reduce braking torque whenever excessive wheel-slip is detected and the wheel-slip is restored to stable-slip region. However, the air venting from the brake-cylinder to rapidly reduce the braking torque produces a limit cycle as the wheel-slip protection system repeatedly engages during a hard-stop. The limit cycle causes vibrations and excessive jerk that reduce passenger comfort and increase wear on brake mechanism of the pneumatic-brakes. Furthermore, in applications where precision stopping is desired such as stopping a subway train at a specific loading position, the limit cycle can degrade stopping accuracy.

Accordingly, there is a need to develop a system and method for effectively preventing the excessive wheel-slip.

SUMMARY

It is an objective of some embodiments to provide a system and a method for wheel-slip prevention in a railway vehicle with a pneumatic brake. Additionally or alternatively, it is an objective of some embodiments to provide such a method for preventing wheel-slip in a railway vehicle with a pneumatic brake that uses a reference governor providing executable instructions for modifying the deceleration reference upon its violation of a wheel-slip constraint and a controller providing executable instructions for mapping the modified deceleration reference to a sequence of control commands for controlling pressure applied by the pneumatic brake. Further, it is objective of some embodiments to achieve smooth deceleration or stopping of the railway vehicle.

Some embodiments are based on recognition that the objective of the pneumatic brake is to decelerate or stop a vehicle. However, wheel-slip, which is undesirable, occurs when braking force applied to a wheel exceeds traction available to that wheel. To that end, some embodiments are based on objective of regulating the wheel-slip.

Some embodiments are based on recognition that in some situations slip can be beneficial. For example, automotive wheel-slip regulating systems, such as traction control and anti-lock braking (ABS), can be integrated with the pneumatic brake to maximize the acceleration or deceleration according to current environmental conditions. In these ABS and traction control the wheel-slip, however, the slip is regulated or control to some ratio, e.g., to 0.1 slip ratio. This is because one of the requirements of car brake design is to stop or decelerate the car as fast as possible, so that the car can be operated even by less experienced drivers in challenging environments.

For the railway vehicle, however, there are different requirements in part as trains are usually operated by expert conductors in predefined dedicated driving conditions. The car brake design applied to the railway vehicles can cause chattering, i.e., periodic braking. The railway vehicles have different dynamics than road vehicles. For instance, friction between a steel wheel and rail is lower and includes different characteristics than friction between a rubber tire and asphalt/concrete. Further, the pneumatic brakes used on many trains have unique control design challenges due to their slow dynamics and non-linear hysteresis. To that end, some embodiments are based on recognition that the railway vehicles have different dynamics than the road vehicles and the car brake designs are not compatible with pneumatic brakes of the railway vehicles.

In some embodiments, to regulate wheel-slip, many railway vehicles with the pneumatic brakes employ a wheel slip protection (WSP) system. The brake-cylinder is filled from a reservoir, kept at a fixed pressure 'p'. The pressure p in the brake-cylinder is regulated by a controller that modulates the valve opening to achieve a specified pressure. When excessive wheel-slip is detected, the WSP vents gas from the brake cylinder to rapidly reduce braking torque such that the reference deceleration is reached. However, such systems produce a limit cycle which causes vibrations and excessive jerk that reduce passenger comfort and increase wear on brake mechanisms of the pneumatic-brakes.

To that end, some embodiments are based on realization that there is a need to avoid excessive slip to ensure comfort of the ride, reduce noise and improve stopping accuracy. Some embodiments are based on a realization that the slip is not utilized as a control reference, but as a constraint to avoid the excessive slip. To use the slip as a constraint, there is a need for constraint control, and the pneumatic brake of railway vehicle is not suitable to incorporate the slip as a constraint. Therefore, in some embodiments, the pneumatic brake is augmented with a reference governor (RG) suitable to incorporate the slip as a constraint. The RG pre-emptively adjusts the deceleration reference to the controller to prevent excessive wheel slip rather than reacting to incipient slip instability as is the case with the WSP system. Since the pneumatic brake is augmented with the RG, rather than replacing the entire the pneumatic brake, the tested and tuned controller of the pneumatic brake is not squandered. Instead, the RG retains the performance of the controller.

Due to complexity of dynamics of braking of the railway vehicle, designing constraint controllers may require extensive online computation, which requires expensive and complex hardware. However, the RG can be used with offline computations to reduce the aforementioned expenses. To that end, some embodiments are based on a realization that the RG precomputes an invariant set of combination of values of state variables of the pneumatic brake and the deceleration reference. In some embodiments, the state variables of the pneumatic brake include one or more of the braking torque to a wheel of the railway vehicle, pressure in the brake-cylinder of the pneumatic brake, and a slip of the wheel.

The RG provides executable instructions for modifying the deceleration reference upon its violation of wheel-slip constraint. In some embodiments, the violation of the wheel-slip constraint corresponds to slip-speed entering into unstable-slip region. In some other embodiments, the violation of the wheel-slip constraint corresponds to lying of the deceleration reference outside the invariant set. The RG uses measurements or estimates of the controller state of the controller, pressure state and brake torque of the brake, and slip-speed of the railway vehicle at time $t_k=k\Delta t$ to modify the deceleration reference to ensure that the wheel-slip constraint is satisfied. The invariant set is a constraint admissible positive invariant (PI) set of values of the state variables of the pneumatic brake and the deceleration reference for which the wheel-slip is maintained below a prescribed level. In other words, if the current values of the state variables of the pneumatic brake and the deceleration reference lie inside the invariant set, then the excessive wheel-slip prevention is ensured.

To that end, some embodiments are based on recognition that the reference governor predicts future violation of the wheel-slip constraint when current values of the state variables of the pneumatic brake and the deceleration reference are outside of the invariant set. Further, the reference governor modifies the current value of the deceleration reference outside of the invariant set to its closest value inside the invariant set and controlled with the corresponding modified deceleration reference from the invariant set. Such a control will prevent the slip not only at the current time but also in a distant future. Therefore, in some embodiments, during online computation, if the current state of the pneumatic brake and the deceleration reference is outside of the invariant set, the reference governor modifies current deceleration reference to its closest value from the invariant set to prevent the excessive slip.

According to some embodiments, the invariant set is determined by a backward-reachable method. The backward-reachable set computation initializes a current set to a feasible set and determines a previous set of states as a subset of the current set. The previous set may also be referred to as a backward reachable set. If the previous set is empty, correct operation of the controller cannot be guaranteed, and is further subjected to reconfiguration which implies that a set P of possible values of the parameters should be reduced in size, by changing the design or objective of the operation of the brake system. If the current set and the previous set are equal, that is the invariant set otherwise, the previous set is assigned to be the current set and the computation iterates again. In some embodiments, the iterations are performed until a termination condition is met. In some embodiments, the termination condition specifies that a difference between the backward-reachable set and the current set is less than or equal to a threshold.

Additionally or alternatively, in some embodiments, the invariant set is determined as a non-convex constraint admissible positive invariant set represented by a union of convex polytopes. In some embodiments, the current set of feasible states comprises a union of polyhedral sets and the backward-reachable set of the current set is computed by computing the backward-reach sets of each polyhedral set that comprises the current set. Further, the backward-reachable set of each polyhedral set is computed by computing the backward-reachable set for each model in the hybrid-model and intersecting the states with the states where the model is active.

In some embodiments, the hybrid model includes three models that describe behaviours of the pneumatic brake. The first model describes the behaviour of the pneumatic brake while the brake cylinder is squeezing. Additionally, or alternatively, the first model includes a constraint on the state variables (torque, pressure, control input, etc) that requires the brake torque to be increasing. The second model describes the behaviour of the pneumatic brake while the brake cylinder is being released. In some embodiments, the second model includes a constraint on the state variables (torque, pressure, control input, etc) that requires the brake torque to be decreasing. The third model describes the behaviour of the pneumatic brake while the brake cylinder is being held. In some embodiments, the third model includes a constraint on the states (torque, pressure, control input, etc) that requires the brake torque to be constant.

Accordingly, one embodiment discloses a control system for wheel-slip prevention in a railway vehicle with a pneumatic brake, including a memory configured to store a reference governor providing executable instructions for modifying the deceleration reference upon its violation of a wheel-slip constraint, and configured to store a controller providing executable instructions for mapping the modified deceleration reference to a sequence of control commands for controlling pressure applied by the pneumatic brake; an input interface configured to accept a deceleration reference for controlling the pneumatic brake; a processor configured to execute the reference governor to modify the deceleration reference and configured to execute the controller to map the modified deceleration reference to the sequence of control commands; and an output interface configured to output the sequence of control commands to control the pneumatic brake.

Another embodiment discloses a method for preventing wheel-slip in a railway vehicle with a pneumatic brake, wherein the method uses a processor coupled to a memory storing a reference governor that provides executable instructions for modifying a deceleration reference upon its violation of a wheel-slip constraint, and a controller providing executable instructions for mapping the modified deceleration reference to a sequence of control commands for controlling pressure applied by the pneumatic brake, the processor is coupled with stored instructions when executed by the processor carry out steps of the method, including accepting a deceleration reference for controlling the pneumatic brake; modifying the deceleration reference and mapping the modified deceleration reference to the sequence of control commands; and outputting the sequence of control commands to control the pneumatic brake.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4 shows a schematic of workflow of a reference governor (RG), according to some embodiments.

FIG. 7B is a block diagram of an exemplar implementation of determining the previous set of states according to one embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" may mean at least partially based on. Further, it is to be understood that the phraseology and terminology employed herein are for the purpose of the description and should not be regarded as limiting. Any heading utilized within this description is for convenience only and has no legal or limiting effect.

Figure 1:
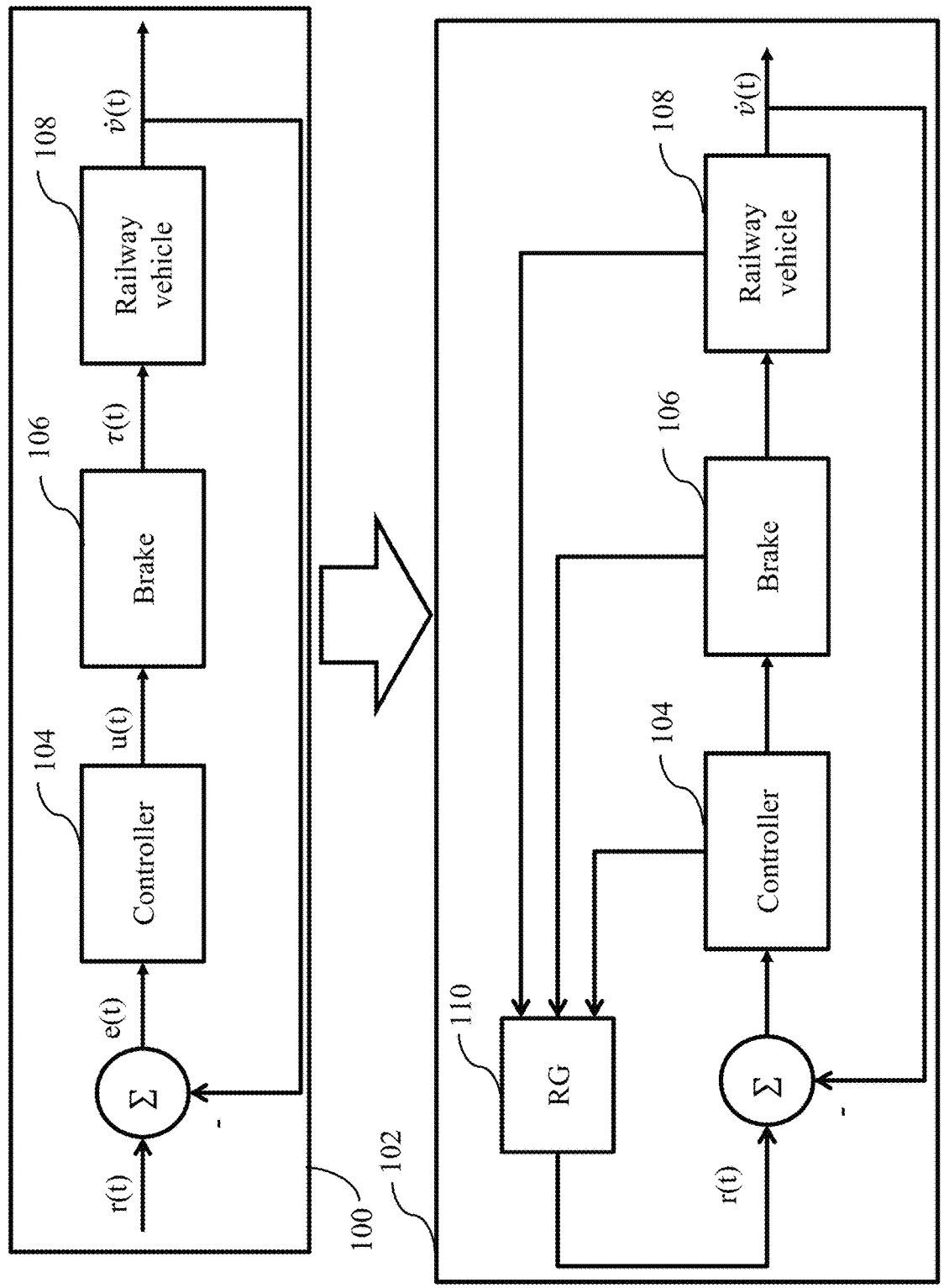
FIG. 1 shows a schematic overview of some principles used by some embodiments to prevent wheel-slip in a railway vehicle with a pneumatic brake.

FIG. 1 shows schematic overview of some principles used by some embodiments to prevent wheel-slip in a railway vehicle with a pneumatic brake. Some embodiments are based on recognition that the objective of the pneumatic brake is to decelerate or stop a vehicle. The vehicle may be a car, bike, bus, or the railway vehicle. However, wheel-slip, which is undesirable in excess, occurs when braking force applied to a wheel exceeds traction available to that wheel. To that end, some embodiments are based on objective of regulating the wheel-slip. Hereinafter, 'wheel-slip' and 'slip' may be used interchangeably and would mean the same.

In some embodiments, a speed sensor is provided to each wheel to measure speed of each wheel and an ECU constantly monitors the speed of each wheel. If the ECU detects that the speed of a wheel is slower than speed of the vehicle, a condition indicative of impending wheel lock, valves are actuated to reduce brake pressure at the affected wheel. Thus, reducing the brake pressure on the affected wheel makes the affected wheel to turn faster. Conversely, in some embodiments, if the ECU detects that the speed of a wheel is greater than the speed of other wheels or the vehicle speed, the brake pressure to the wheel is increased so the brake pressure is reapplied, slowing down the wheel. Some embodiments are based on a realization that a control objective is to track a reference acceleration or deceleration. In some embodiments, the wheel-slip is regulated to a deceleration reference.

Some embodiments are based on recognition that in some situations slip can be beneficial. For example, automotive wheel-slip regulating systems, such as traction control and anti-lock braking (ABS), can be integrated with the pneumatic brake to maximize the acceleration or deceleration according to current environmental conditions. In these ABS and traction control the wheel-slip, however, the slip is regulated or control to some ratio, e.g., to 0.1 slip ratio. This is because one of the requirements of car break design is to stop or decelerate the car as fast as possible, so that the car can be operated even by less experienced drivers in challenging environments.

For the railway vehicle, however, there are different requirements in part as trains are usually operated by expert conductors in predefined dedicated driving conditions. The car break design if applied to the railway vehicles can cause chattering, i.e., periodic breaking. The railway vehicles have different dynamics than road vehicles, such as cars, motorcycles, trucks, and buses. For instance, friction between a steel wheel and rail is lower and includes different characteristics than friction between a rubber tire and asphalt. Further, the pneumatic brakes used on many trains have unique control design challenges due to their slow dynamics and non-linear hysteresis. To that end, some embodiments are based on recognition that the railway vehicles have different dynamics than the road vehicles and the car break design are not compatible with pneumatic brakes of the railway vehicles.

In some embodiments, to regulate wheel-slip, many railway vehicles with the pneumatic brakes employ a wheel slip protection (WSP) system. A block diagram of a closed-loop pneumatic brake for railway vehicle 100 includes a controller 104, brake system 106, and railway vehicle 108. Braking torque τ (t) is produced when brake-block comes into contact with wheel of the railway vehicle. A contact force is controlled by pressure p(t) in the brake-cylinder. The brake-cylinder is filled from a reservoir which can be kept at a fixed pressure p. The pressure p (t) in the brake-cylinder is regulated by controller 104 that modulates the valve opening to achieve a specified pressure. The block diagram 100 refers to a closed-loop pneumatic brake system. The controller 104 can be a proportional integral derivative (PID) controller, a proportional integral (PI) controller or a proportional derivative (PD) controller. The specified pressure u (t) is determined by the controller 104. When excessive wheel-slip is detected, the WSP vents gas from the brake cylinder to rapidly reduce braking torque such that the reference deceleration is reached. However, such systems produce a limit cycle, which causes vibrations and excessive jerk that reduces passenger comfort and increases wear on brake mechanism of the pneumatic-brakes.

To that end, some embodiments are based on realization that there is a need to avoid excessive slip to ensure comfort of the ride, reduce noise and improve stopping accuracy. Some embodiments are based on a realization that the slip is not utilized as a control reference, but as a constraint to avoid the excessive slip. To use the slip as a constraint, there is a need for constraint control, and the pneumatic brake 100 of railway vehicle is not suitable to incorporate the slip as a constraint. Therefore, in some embodiments, the pneumatic brake 100 is augmented with a reference governor. A block diagram of the augmented pneumatic brake 102 includes the controller 104, the brake system 106, the railway vehicle 108 and reference governor (RG) 110. The RG pre-emptively adjusts the deceleration reference to the controller 104 to prevent excessive wheel slip rather than reacting to incipient slip instability as is the case for the WSP system. Since the pneumatic brake 100 is augmented with the RG 110, rather than replacing the entire the pneumatic brake, the tested and tuned controller 104 of the pneumatic brake 100 is not squandered. Instead, the RG 110 retains the performance of the controller 104, but adds a feature i.e. enforcing the wheel-slip constraint.

Due to complexity of dynamics of breaking of the railway vehicle, designing constraint controllers may require extensive online computation, which requires expensive and complex hardware. However, the reference governor 110 can be used with offline computations to reduce the aforementioned expenses. To that end, some embodiments are based on a realization that the reference governor precomputes an invariant set of combination of values of state variables of the pneumatic brake and the deceleration reference. In some embodiments, the state variables of the pneumatic brake include the braking torque to a wheel of the railway vehicle and a slip of the wheel. In some embodiments, the state variables of the pneumatic brake include the braking torque to a wheel of the railway vehicle, pressure in the brake-cylinder of the pneumatic brake, and a slip of the wheel.

The reference governor (RG) 110 provides executable instructions for modifying the deceleration reference upon its violation of wheel-slip constraint. The RG uses measurements or estimates of the controller state $x_u(t_k)$ of the controller 104, pressure state $x_p(t_k)$ and brake torque $\tau(t_k)$ of the brake 106, and slip-speed $s(t_k)$ of the railway vehicle 108 at time $t_k = k\Delta t$ to modify the deceleration reference r(t) to ensure that the wheel-slip constraint is satisfied.

As used herein, the wheel-slip constraint maintains the slip $s(t_k) \leq s_{max}$ below a prescribed maximum slip $s_{max}$. The maximum slip $s_{max}$ can be determined from a variety of sources for instance based on known friction characteristics of the wheel/rail or based on a customer requirement.

The invariant set is a constraint admissible positive invariant (PI) set of values of the state variables of the pneumatic brake and the deceleration reference for which the wheel-slip is maintained below a prescribed level at the current time and for all future times. In other words, if the current values of the state variables of the pneumatic brake and the deceleration reference lie inside the invariant set at the current time, then the excessive wheel-slip prevention is ensured for all future times with the same deceleration reference. The invariant set is also referred to as set of admissible references. In some embodiments, the invariant set is referred to as the PI set.

To that end, some embodiments are based on recognition that the reference governor 110 predicts future violation of the wheel-slip constraint when current values of the state variables of the pneumatic brake and the deceleration reference are outside of the invariant set. Further, the reference governor 110 modifies the current value of the deceleration reference outside of the invariant set to its closest value inside the invariant set and controlled with the corresponding modified deceleration reference from the invariant set. Such a control will prevent the slip not only in immediate but even in a distant future. Therefore, in some embodiments, during online computation, if the current state of the pneumatic brake and the deceleration reference is outside of the invariant set, the reference governor modifies the current deceleration reference to its closest value from the invariant set to prevent the excessive slip.

Figure 2A:
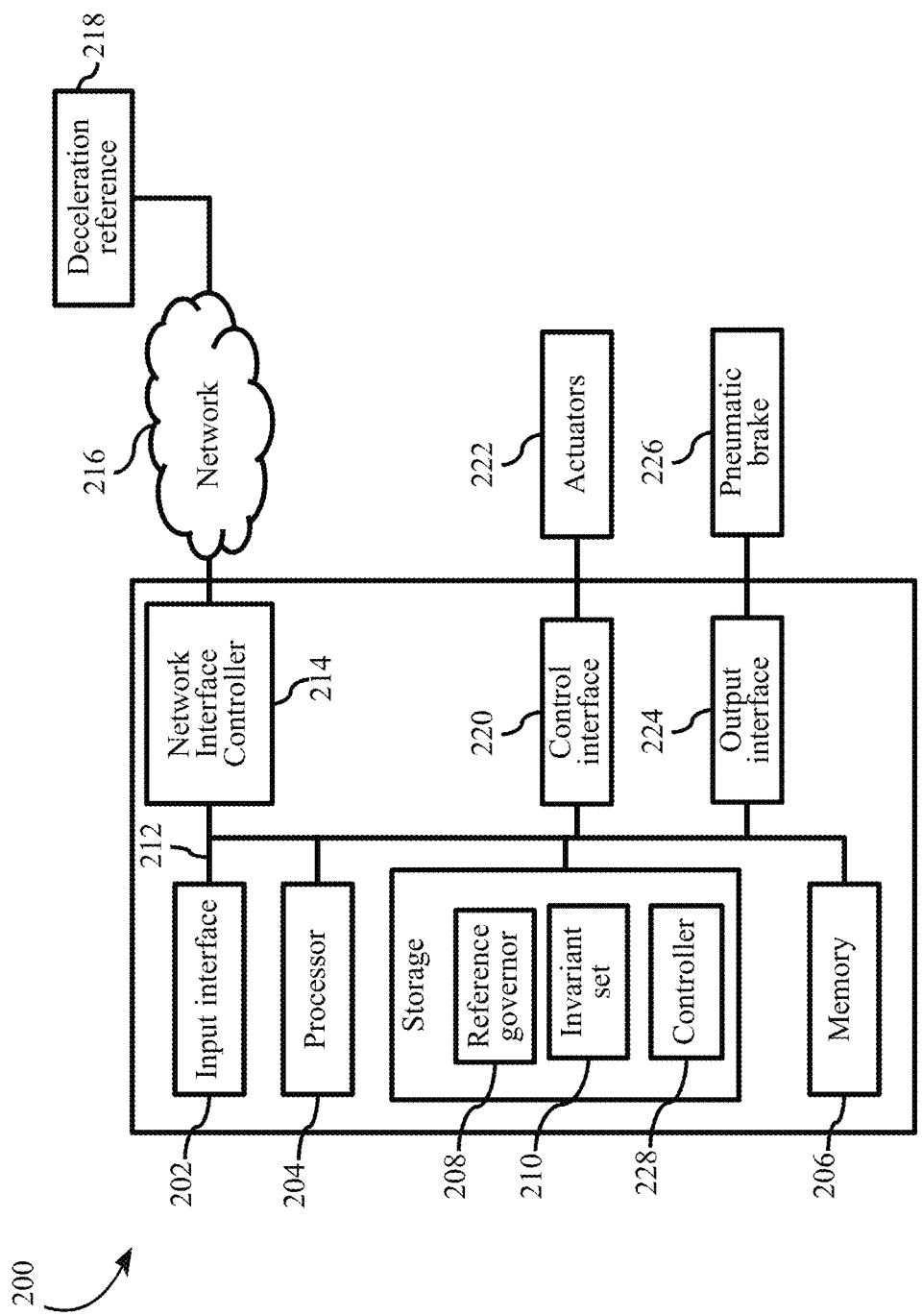
FIG. 2A shows a block diagram of a control system for the wheel-slip prevention in the railway vehicle with the pneumatic brake, according to some embodiments.

FIG. 2A shows a block diagram of a control system for the wheel-slip prevention in the railway vehicle with the pneumatic brake, according to some embodiments. The control system 200 includes an input interface 202 and an output interface 224 for connecting the control system 200 with other systems and devices. In some embodiments, the control system 200 may include a plurality of input interfaces and a plurality of output interfaces. The input interface 202 is configured to accept a deceleration reference for controlling the pneumatic brake. The input interface 202 includes a network interface controller (NIC) 214 adapted to connect the control system 200 through a bus 212 to a network 216. Through the network 216, either wirelessly or through wires, the control system 200 receives the deceleration reference 218.

In some embodiments, the deceleration reference is generated in response to actions of a railway operator. For example, the deceleration reference is received, from a train operator, when the train operator applies brake. In some other embodiments, the deceleration reference is received from a high level controller integrated for instance for autonomous railway vehicles. The deceleration reference can be a reference trajectory.

The control system 200 further includes a processor 204 and a memory 206 that stores instructions that are executable by the processor 204. The processor 204 may be a single core processor, a multi-core processor, a computing cluster, or may comprise any number of other configurations. The memory 206 may include random access memory (RAM), read only memory (ROM), flash memory, or any other suitable memory system. The processor 204 is connected through the bus 212 to one or more input and output devices. The stored instructions implement a method for preventing wheel-slip in the railway vehicle with the pneumatic brake.

The memory 206 is also configured to store a reference governor 208 providing executable instructions for modifying the deceleration reference upon its violation of the wheel-slip constraint. The wheel-slip constraint is a function of state variables of the pneumatic brake. The state variables of the state of the pneumatic brake include the braking torque to a wheel of the railway vehicle, pressure in the brake-cylinder of the pneumatic brake, and the slip of the wheel. The processor 204 is configured to execute the reference governor 208 to modify the deceleration reference such that the wheel-slip is prevented.

The pressure in the brake-cylinder of the pneumatic brake is proportional to operation of brake lever by the railway operator. When the driver operates the brake lever, the pressure inside the brake-cylinder is released, resulting in engaging of the brake. The braking torque is a feed forward element for the operation of the railway vehicle. The slip of the wheel is used as feedback for operation of the pneumatic brake. Further, the slip can be used to determine the influence of the slip in decelerating or stopping the railway vehicle. The substantial variation of the braking torque under the synergistic influence of the pressure in the brake-cylinder and the slip of the wheel considerably defines the braking operation and performance. To that end, some embodiments are based on recognition that the combination of values of the aforementioned state variables and the deceleration reference can be utilized, by the control system 200, for the wheel-slip prevention in the railway vehicle. To that end, in some embodiments, the memory 206 is further configured to store an invariant set 210 of a combination of values of the state variables of the pneumatic brake and the deceleration references.

Figure 2B:
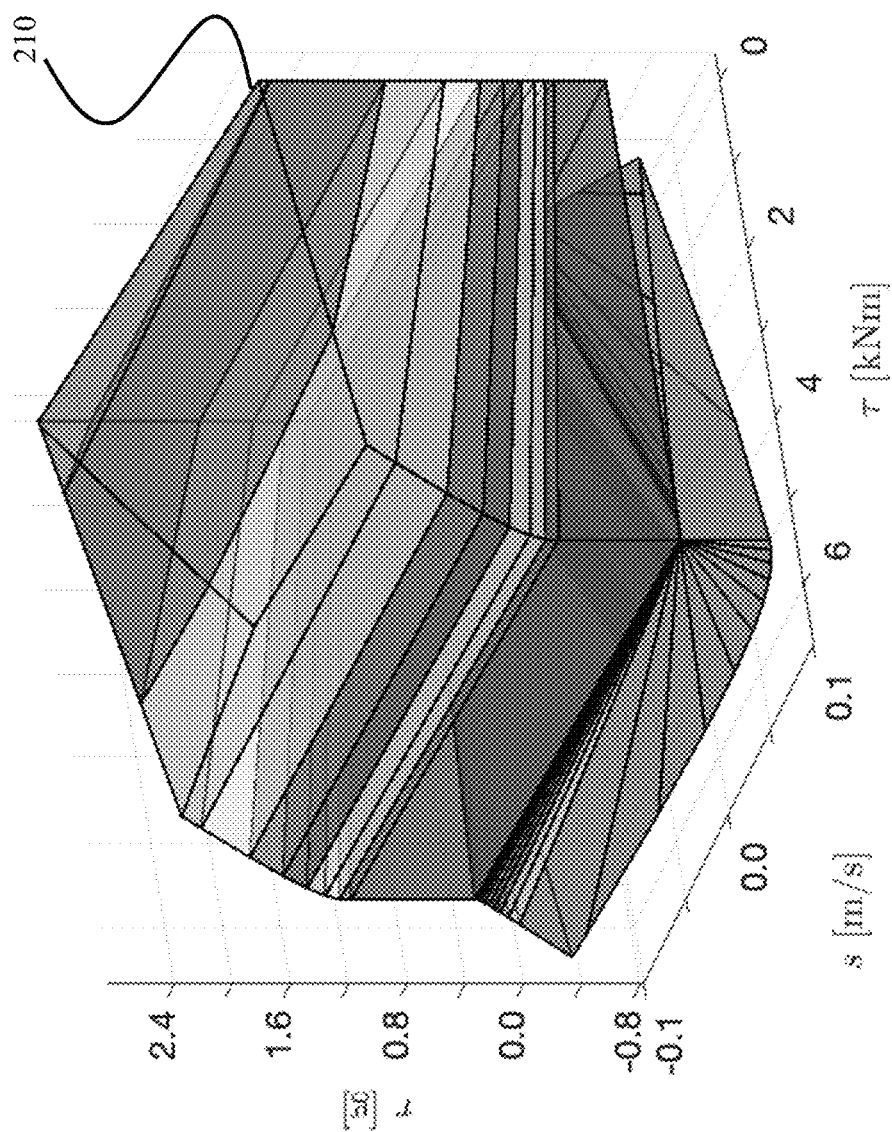
FIG. 2B shows an exemplary invariant set stored in the control system, according to some embodiments.

FIG. 2B shows an exemplary invariant set 210 stored in the memory 206 of the control system 200, according to some embodiments. The exemplar invariant set 210 is multi-dimensional and is defined by four parameters i.e. braking torque to the wheel of the railway vehicle $\tau_B$, pressure in the brake-cylinder of the pneumatic brake P, the slip of the wheel S and the deceleration difference DR. The invariant set 210 includes different sets; each set defined by combination of the respective aforementioned parameters. For example, the set 1 of invariant set 210 is defined by the combination of the braking torque to the wheel of the railway vehicle $\tau_{B1}$, pressure in the brake-cylinder $P_1$, the slip of the wheel $S_1$ and the deceleration difference $DR_1$. Similarly, the invariant set 210 may include n-sets and each set defined by the combination of respective aforementioned parameters. According to some embodiments, the invariant set 210 is a constraint admissible positive invariant set of values of the state variables of the pneumatic brake and the deceleration reference for which the wheel-slip is maintained below a prescribed level. To that end, some embodiments are based on a realization that if the pneumatic brake is operated such that the state variables of the pneumatic brake and the deceleration reference lie inside the invariant set 210, then wheel-slip can be prevented. Some other embodiments are based on a realization that if a current deceleration reference lies inside the invariant set 210, then wheel-slip can be prevented.

The reference governor 208 predicts the future violation of the wheel-slip constraint when current values of the state variables of the pneumatic brake and the deceleration reference are outside of the invariant set 210. The processor 204 is configured to execute the reference governor 208 to modify the deceleration reference. The reference governor 208 modifies the current value of the deceleration reference outside of the invariant set 210 with its closest value inside the invariant set 210. In some embodiments, the invariant set 210 is determined using a backward reachable method that iteratively determines the invariant set 210, starting from a current set of feasible states of the pneumatic brake and the deceleration reference.

Further, in some embodiments, the memory 206 is further configured to store a controller 228 providing executable instructions for mapping the modified deceleration reference to a sequence of control commands to control the pneumatic brake. The processor 204 is configured to execute the controller 228 to map the modified deceleration reference to the sequence of control commands. 17. In some embodiments, a control command is determined for a control step, such that the sequence of control commands is determined for a sequence of control steps. The embodiments execute the reference governor for each of the control steps to adapt the control of the brake to changes of the slip even after the slip has been detected, i.e., after wheel-slip constraint is violated.

The output interface 224 is configured to output the sequence of control commands to control a pneumatic brake 226. In some embodiments, the controlling of the pneumatic brake 226 based on the sequence of control commands includes controlling of parameters of the pneumatic brake such as pressure applied by the brake, pressure inside the brake-cylinder, braking torque, valve opening or closing and the like. In some embodiments, the system 200 may also be connected to a control interface 220 adapted to connect the control system 200 to actuators 222 of the pneumatic brake system. Through the control interface 220, the control system 200 is configured to control the actuators 222 of the pneumatic brake system based on the sequence of control commands.

Figure 3A:
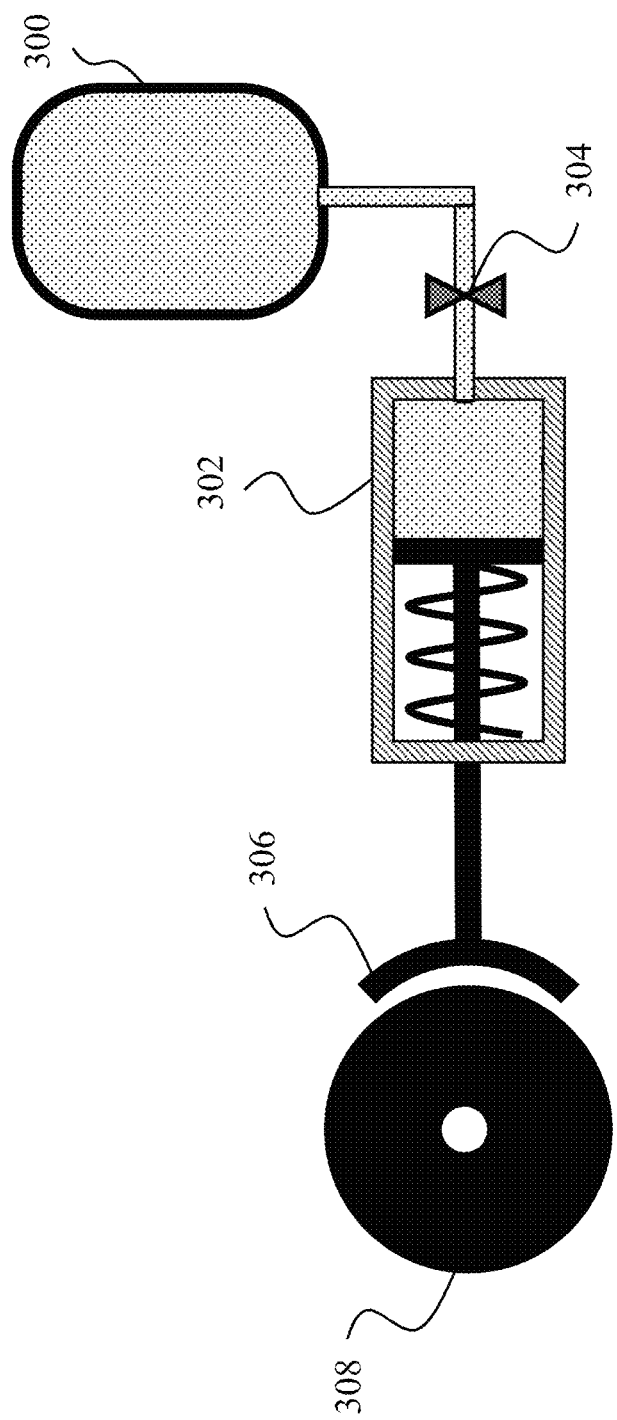
FIG. 3A shows a schematic of a pneumatic brake system, according to some embodiments.

FIG. 3A shows a schematic of a pneumatic brake system, according to some embodiments. In some embodiments, the control system 100 is integrated with the pneumatic brake system. The pneumatic brake system comprises a reservoir 300 storing compressed air, a brake-cylinder 302, a valve 304 and brake pad 306. The brake-cylinder 302 is filled from the reservoir 300 to apply a braking torque to a wheel 308 of the railway vehicle in proportion to pressure p (t) in the brake cylinder 302. The valve 304 is arranged between the reservoir 300 and the brake-cylinder 302 to regulate the pressure p (t) in the brake-cylinder in accordance with the sequence of control commands. In some embodiments, the pressure p (t) in the brake-cylinder is regulated by an integrated controller that modulates the valve opening to achieve a specified pressure. The response of the actual brake-cylinder pressure p (t) to the specified pressure is modelled by a linear system, defined by $$\dot{x}_p(t) = A_p x_p(t) + B_p u(t) \quad (1a)$$

$$p(t) = C_p x_p(t) + D_p u(t) \quad (1b)$$

where the dynamics (1a & 1b) have unit dc-gain $C(I-A)^{-1}B_p + D_p = 1$ since the brake-cylinder pressure p(t) asymptotically tracks reference pressure u (t). Other embodiments of the invention can be applied to nonlinear brake models or model with non-unit dc-gain. The brake-cylinder pressure cannot be lower than ambient pressure p=0. Further, the brake-cylinder pressure cannot be higher than the reservoir pressure. Thereby, control input or the reference pressure u(t) cannot command a pressure outside a range of admissible pressures $\bar{p}$. Thus, $$0 \leq p(t) \leq \bar{p} \quad (I)$$

$$0 \leq u(t) \leq \bar{p} \quad (II)$$

Other embodiments of the invention can use different constraints on the pressure and control input.

Figure 3B:
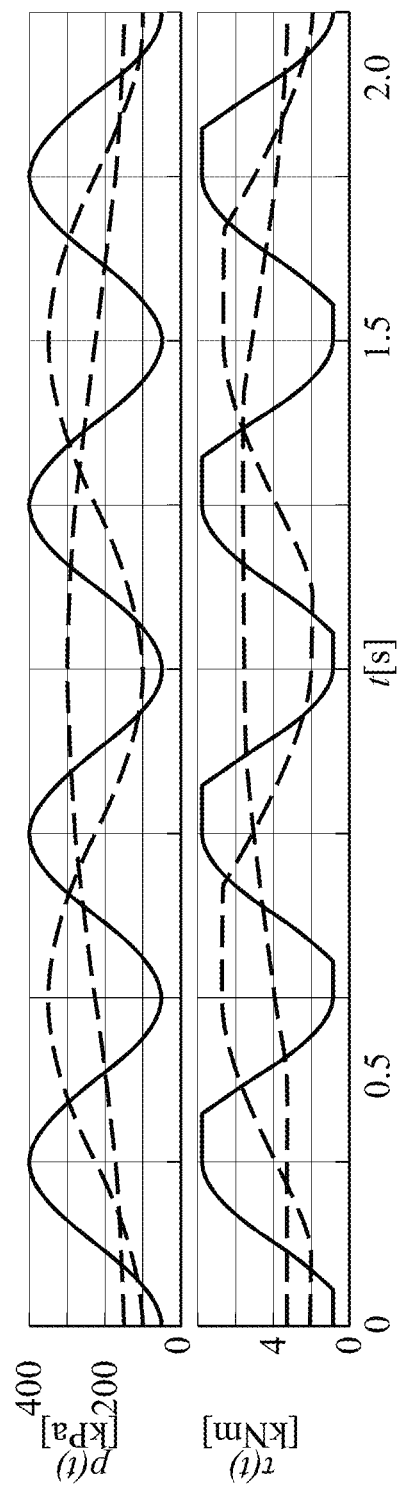
FIG. 3B shows the response of brake torque τ(t) to sinusoidally varying
brake-cylinder pressure, according to some embodiments.

FIG. 3B shows response of the brake torque τ(t) to sinusoidally varying brake-cylinder pressure p(t)=a sin(ωt). This figure does not show a feature of the invention. Instead this plot is included to demonstrate hysteresis which is an important feature of the pneumatic brake that the invention must consider. Nominally, increasing $\dot{p}(t)>0$ the brake-cylinder pressure p(t) increases $\dot{\tau}(t)>0$ the brake torque τ (t). Decreasing the pressure $\dot{p}$ (t)<0 decreases torque $\dot{\tau}$ (t)<0. However, when the brake-cylinder switches from filling $\dot{p}$ (t)>0 to venting $\dot{p}(t)<0$, the brake torque initially does not respond $\dot{p}$ (t)=0. Likewise, $\dot{p}$ (t)=0 when switching from venting $\dot{p}$ (t)<0 to filling $\dot{p}$ (t)>0 as shown in FIG. 3C.

Figure 3C:
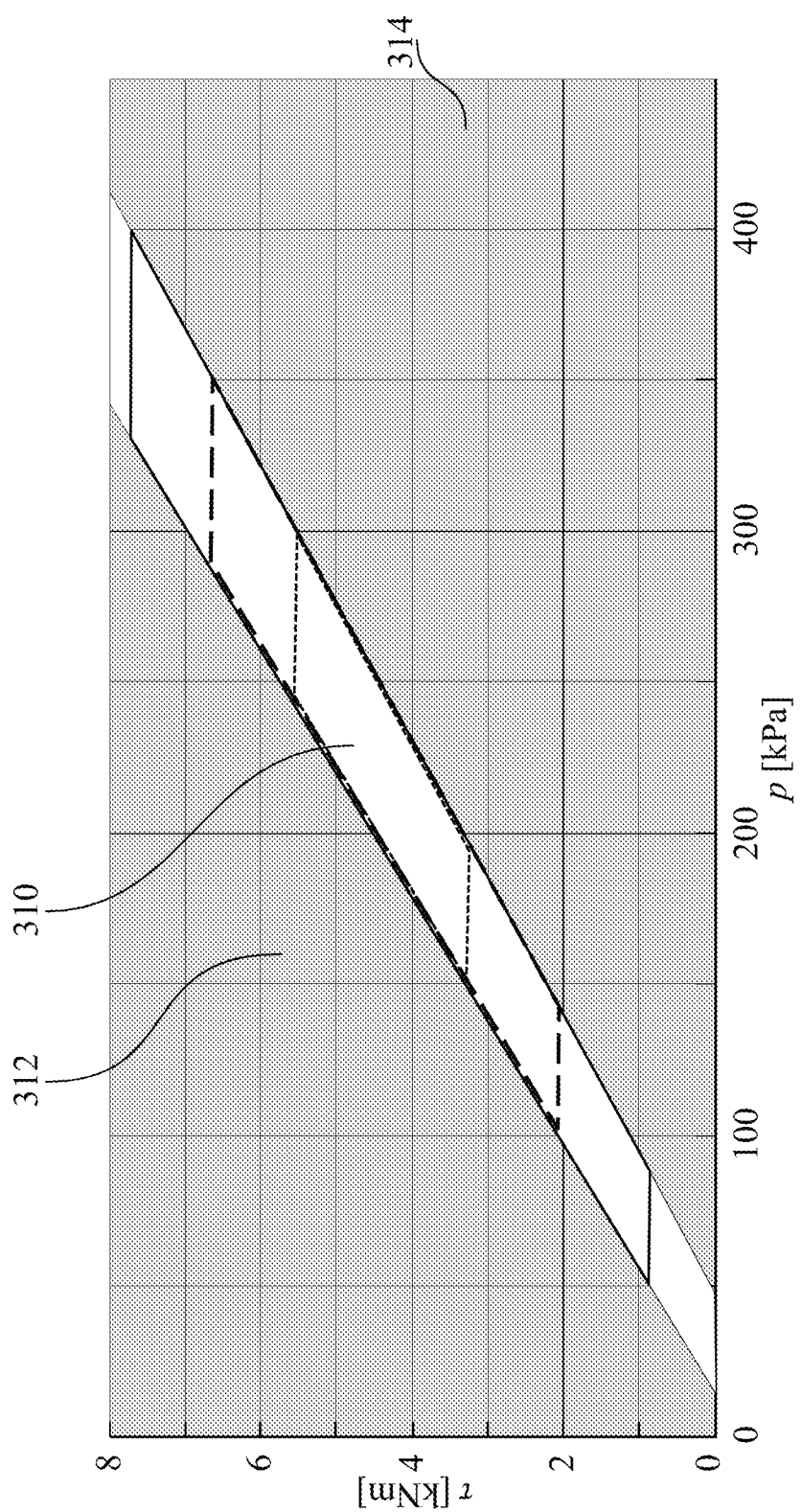
FIG. 3C depicts the brake torque τ as a function of the brake-cylinder pressure p, according to some embodiments.

FIG. 3C depicts the brake torque as a function of the brake-cylinder pressure. Again, this figure is included to demonstrate the hysteresis behavior of the brake which the invention must consider. The brake torque only increases $\dot{\tau}$ (t)>0 when the brake-cylinder pressure p(t) lies on the squeezing surface 314 τ (t)=$\bar{\alpha}$p(t)+$\bar{\beta}$. Likewise, the brake torque only decreases $\dot{\tau}$ (t)>0 along the releasing surface 312 τ (t)=$\underline{\alpha}$p(t)+$\underline{\beta}$. Otherwise, the brake torque is constant $\dot{\tau}$ (t)=0.

The nonlinear hysteresis behaviour of the brake shown in FIGS. 3B and 3C is modelled by the following hysteresis dynamics.

$$\dot{\tau}(t) = \begin{cases} \bar{\alpha}\dot{p}(t) & \text{if } \tau(t) = \bar{\alpha}p(t) + \bar{\beta}, \ \dot{p}(t) \geq 0 \\ \underline{\alpha}\dot{p}(t) & \text{if } \tau(t) = \underline{\alpha}p(t) + \underline{\beta}, \ \dot{p}(t) \leq 0 \\ 0 & \text{otherwise} \end{cases} \quad (2)$$

where the gains $\bar{\alpha}$ and $\underline{\alpha}$ describe how changes in the brake-cylinder pressure $\dot{p}(t)$ affect change in the braking torque $\dot{\tau}$ (t) when the braking-cylinder is being filled $\dot{p}$ (t)≥0 and emptied $\dot{p}$ (t)≤0, respectively. The brake torque remains constant $\dot{\tau}$ (t)=0 as the brake-cylinder pressure moves between the squeezing τ (t)=$\bar{\alpha}$p(t)+$\bar{\beta}$ and releasing τ (t)=$\underline{\alpha}$p(t)+$\underline{\beta}$ regions 310.

Some embodiments consider the brake hysteresis since it delays switching between squeezing and releasing the brake. Hysteresis can cause problems with other control schemes. For instance, a standard linear controller may start filling the brake cylinder, but due to the delay caused by hysteresis this does not cause an immediate response in the braking torque (and thus train speed). So, the controller may over fill the brake-cylinder before the brake responds resulting in too much braking torque and therefore excessive wheel-slip once the delay due to hysteresis ends. Then, the controller must empty the brake-cylinder, but again due to the delay caused by hysteresis the controller will empty the brake-cylinder requiring the controller to refill the cylinder. If the controller is not designed correctly, then this process can repeat indefinitely with the brake-cylinder pressure oscillating with increasing amplitude. The invention does not exhibit this issue since it uses a model of the brake hysteresis to anticipate delays when switching between filling and emptying the brake cylinder.

According to some embodiments, the brake controller (i.e. controller 104) includes two modes, namely, reference tracking and slip protection. In the tracking mode, the control objective is to follow a deceleration command provided by the train operator or high-level controller. This is accomplished using a linear controller described by a linear system $$\dot{x}_u(t) = A_u x_u(t) + B_u e(t) \quad (3a)$$

$$u(t) = C_u x_u(t) + D_u e(t) \quad (3b)$$

where the tracking error $e(t) = \dot{v}(t) - r(t)$ is the difference between actual $\dot{v}(t)$ and desired r(t) deceleration reference r(t) and the output of the controller (3a & 3b) is set-point u(t) of the brake-cylinder pressure. The linear controller (3a & 3b) is dynamic since it includes integral-action for offset-free steady-state tracking for e.g. a proportional-integral controller is typically used. In some embodiments, the controller is observer-based and, consequently, the linear controller (3a & 3b) includes the observer dynamics.

If slip-speed s(t) enters an unstable-slip region s(t)>$\bar{s}$, then the brake controller enters into the slip protection mode where the control objective is to return the slip-speed to a stable-slip region. This is accomplished by venting the brake-cylinder pressure p(t) which eventually reduces brake torque τ (t) allowing the slip-speed s(t) to re-enter the stable-slip region s(t)≤$\bar{s}$. This is modeled by setting the desired brake-cylinder pressure to zero i.e. u(t)=0.

The control objectives in the two modes i.e. the reference tracking and slip protection, results the limit cycle where the brake-cylinder pressure is alternatingly increased to produce the desired braking torque and vented to halt excessive slip. This limit cycle causes vibrations, reducing the passenger comfort and wear on the brake mechanism. Therefore, to overcome the aforementioned undesired effects, a wheel-slip prevention system which pre-emptively modifies the deceleration reference r(t) is provided. The deceleration reference r(t) is modified such that the closed-loop pneumatic brake system 100 satisfies output constraints:

$$y = \left\{ \begin{bmatrix} u \\ p \\ t \\ s \end{bmatrix} : 0 \leq u, \ p \leq \bar{p}, \ s \leq \bar{s} \right\} \quad (4)$$

The reference governor (RG) 208 is designed to provide executable instructions for modifying the deceleration reference r(t) upon its violation of the wheel-slip constraint. The RG is executed by the processor 204. In some embodiments, the violation of the wheel-slip constraint corresponds to the slip-speed entering into the unstable-slip region. In some other embodiments, the violation of the wheel-slip constraint corresponds to the deceleration reference lying outside the invariant set. In yet some other embodiments, the violation of the wheel-slip constraint refers to the closed-loop pneumatic brake system 100 not satisfying the output constraints (4).

FIG. 4 shows a schematic of workflow of the reference governor (RG), according to some embodiments. The measurements or estimates of states of the pneumatic brake system, such as the controller state $x_u(t_k)$, the pressure state $x_p(t_k)$ and the brake torque τ ($t_k$), and the slip-speed s($t_k$) at time $t_k = k\Delta t$, are obtained 400. The reference governor checks for violation of the wheel-slip constraint 402. If there is no violation of the wheel-slip constraint, then it implies that the wheel-slip constraint is satisfied. Therefore, no modification to the deceleration reference r(t) 404 is made.

If the wheel-slip constraint is violated, then the RG uses measurements or estimates of the controller state $x_u(t_k)$, the pressure state $x_p(t_k)$ and the brake torque τ ($t_k$), and the slip-speed s($t_k$) at time $t_k = k\Delta t$ to modify the deceleration reference r(t) 406. The RG modifies the deceleration reference r(t) 406 such that the wheel-slip constraint is satisfied 408. In particular, the objective of the RG is to prevent the slip-speed s($t_k$) from leaving the stable-slip region s($t_k$)≤$\bar{s}$.

In some embodiments, the RG takes the form of a state-dependent non-convex optimization problem as defined below:

$$r(t_k) = \arg\min_r |r - r(t)| \qquad (5a)$$

$$\text{such that } r \in R(x(t_k)) \qquad (5b)$$

which minimizes (5a) the difference $|r-r^0(t^k)|$ between requested $r^0(t_k)$ and implemented $r(t_k)=r^*$ deceleration references subject to the implemented reference r contained (5b) in a state-dependent set of admissible references $\mathcal{R}(x)$. In some embodiments, the reference governor modifies the deceleration reference outside of the invariant set with its closest value inside the invariant set to satisfy the wheel-slip constraint. The set of admissible references $\mathcal{R}(x)$ or the invariant set is designed so that, not only are the constraints (4) satisfied at the current time $t_k=k\Delta t$, but also that it remains possible to satisfy them for all future times $t > k\Delta t$.

Piecewise Affine (PWA) of the Closed-Loop Brake System

The brake-cylinder pressure dynamics (1a & 1b) and tracking controller dynamics (3a & 3b), that are modelled as the linear systems, converted to discrete-time since linear systems are a special-case of PWA models. Further, the constraints (I & II) on the brake-cylinder pressure and the control input are polyhedral.

The brake-hysteresis (2) is modeled in the discrete-time by:

$$\tau = \begin{cases} \overline{\alpha}p + \overline{\beta} & \text{if } \tau^- \le \overline{\alpha}p + \overline{\beta}, u \ge p \\ \underline{\alpha}p + \underline{\beta} & \text{if } \tau^- \ge \underline{\alpha}p + \underline{\beta}, u \le p \\ \tau^- & \text{otherwise} \end{cases} \qquad (6a)$$

where $p=p(t_k)$ and $\tau^-=\tau(t_{k-1})$ are current break-cylinder pressure and previous brake-torque, respectively, at the k-th sample-time $t_k=k\Delta t$. In some embodiments, the equation (6a) only approximates the continuous-time hysteresis (2) since a mode (squeeze, release, hold) transition occurs between sample instances $k\Delta t$, $(k+1)\Delta t$ rather than at an exact sample instance $k\Delta t$. Therefore, the brake torque $\tau(t_k)$ equals to the sum of torques for each mode weighted by fraction of time spend in that mode. Since the sample-time rate is fast $\Delta t$ relative to the system dynamics and torque varies continuously with the brake-cylinder pressure, the approximation (6a) is valid.

The constraint from (2) requiring that the brake-cylinder is not venting $\dot{p}(t) \ge 0$ in the squeeze region was replaced with the constraint $u(t_k) \ge p(t_k)$ in (6). These constraints are equivalent since assumption that the pressure dynamics (1a & 1b) respond monotonically to pressure commands $u(t)$ is considered. According to some embodiments, using the constraint $u(t_k) \ge p(t_k)$ avoids noise issues associated with numerically differentiating the pressure $$\dot{p}(t) \approx \frac{p(t_k) - p(t_{k-1})}{\Delta t}.$$

Further, the constraint $\dot{p}(t) \ge 0$ from (2) requiring that the brake cylinder is not filled in the release region replaced with the equivalent constraint $u(t_k) \le p(t_k)$.

Due to nonlinear friction f $(s)=\mu(s)N$, nonlinearity and uncertainty exists in slip dynamics. To that end, some embodiments are based on a realization that instead of considering an individual adhesion-curve, a set that covers all the possible adhesion-curves in the stable-slip region are considered to reduce the nonlinearity and uncertainty in the slip dynamics.

Figure 5:
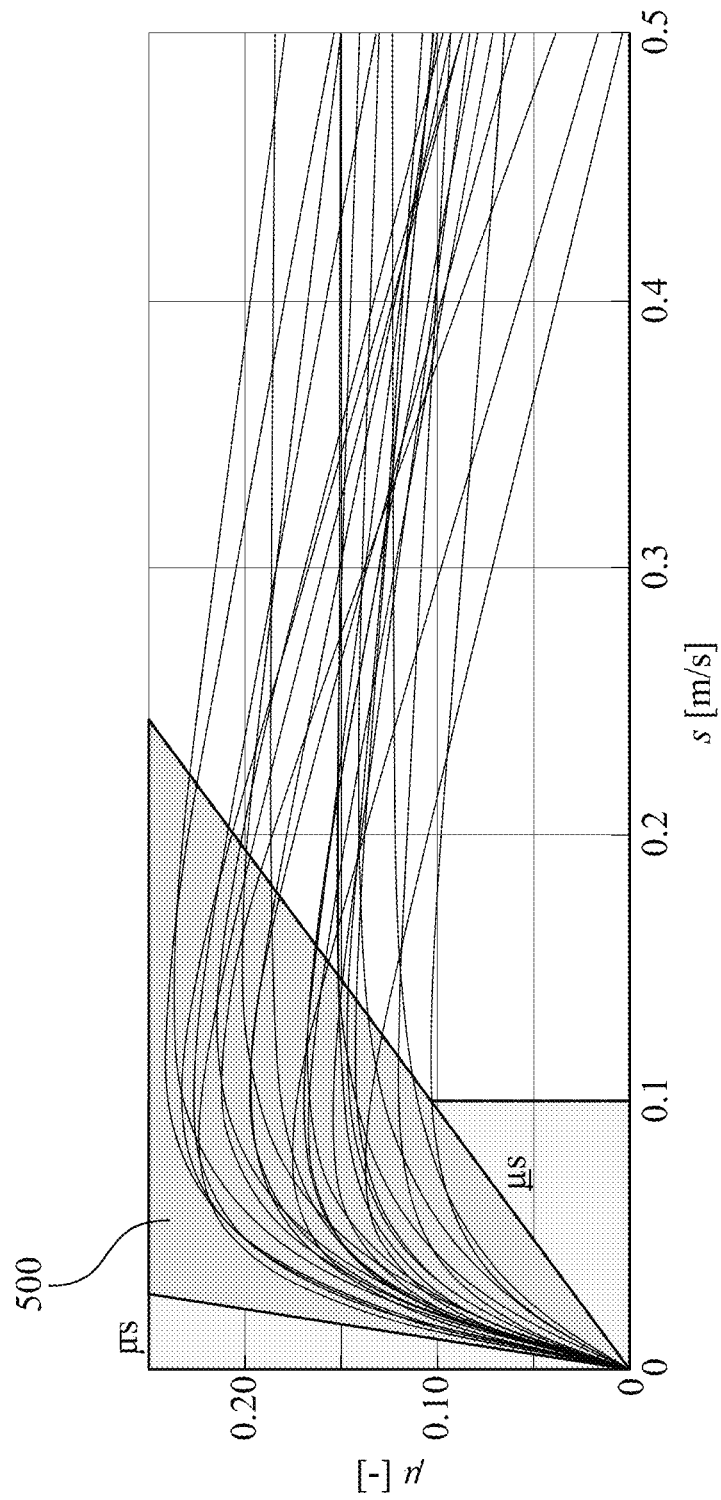
FIG. 5 shows a cone covering possible adhesion-curves inside a stable-slip region, according to some embodiments.

FIG. 5 shows a cone 500 covering possible adhesion-curves inside a stable-slip region, according to some embodiments. The extreme linear adhesion-curves $\overline{\mu}s$ and $\underline{\mu}s$ bound the cone 500 of possible adhesion-curves. Therefore, the friction force f $(s)=\mu(s)N$ are bounded by the extreme linear friction-curves $\underline{f}s$ and $\overline{f}s$ where $\underline{f}=\underline{\mu}\underline{N}$ and $\overline{f}=\overline{\mu}\overline{N}$, and $\underline{N}$ and $\overline{N}$ are bounds on normal force. The slip-dynamics can then be bounded by differential inclusion:

$$\dot{s}(t) \in \left\{ -\frac{J+Mr^2}{MJ}f(s(t)) + \frac{r}{J}\tau(t): \underline{f}s(t) \le f(s(t)) \le \overline{f}s(t) \right\}$$

According to some embodiments, in discrete-time, the above differential inclusion can be modelled by the following scalar linear parametric differential inclusion:

$$s(t_{k+1}) = a_s(\xi)s(t_k) + b_s(\xi)\tau(t_k) \qquad (6b)$$

where $s(t_k)$ and $\tau(t_k)$ are the slip $s(t)$ and brake-torque $\tau(t)$ sampled at the k-th sample-time $t_k=k\Delta t$. The uncertain model parameters $a_s(\xi)$ and $b_s(\xi)$ are given by convex combinations $a_s(\xi)=\xi \underline{a}_s + (1-\xi)\overline{a}_s$ and $b_s(\xi)=\xi \underline{b}_s + (1-\xi)\overline{b}_s$ where $(\underline{a}_s, \overline{a}_s)$ and $(\underline{b}_s, \overline{b}_s)$ are bounds on the parameters $a_s$ and $b_s$ respectively.

In some embodiments, the unknown time-varying parameter $\xi(t) \in [0, 1]$ accounts for both the uncertainty and nonlinearity of the slip dynamics due to the adhesion-curve. Since (6b) is a first-order system, only a single parameter $\xi \in [0, 1]$ is needed to cover the model uncertainty. Replacing the nonlinear slip-dynamics with the uncertain linear dynamics (6b) does not adversely affect stability since common Lyapunov function V $(s)=s^2$ is decreasing as $a_s(\xi) < 1$ for all $\xi \in [0, 1]$ when the slip-speed is low $s \le \overline{s}$.

In some embodiments, the discrete-time dynamics (6a & 6b) are combined into a single PWA system with polyhedral constraints and parametric uncertainty as given below $$x(t_{k+1}) = \begin{cases} A_1 x(t_k) + B_1 r(t_k) + b_1 & \text{if } y(t_k) \in y_1 \\ A_2 x(t_k) + B_2 r(t_k) + b_2 & \text{if } y(t_k) \in y_2 \\ A_3 x(t_k) + B_3 r(t_k) + b_3 & \text{if } y(t_k) \in y_3 \end{cases} \qquad (7a)$$

$$y(t_k) = Cx(t_k) + Dr(t_k) + d \qquad (7b)$$

where the state $x(t_k) = [x_u(t_k), x_p(t_k), \tau(t_{k-1}), s(t_k)]$ is comprised of the current states of the controller $x_u(t_k)$ and the brake-cylinder pressure $x_p(t_k)$, the previous brake torque $\tau(t_{k-1})$, and the current wheel-slip $s(t_k)$. The constrained outputs $y(t_k) = [u(t_k), p(t_k), \tau(t_{k-1}), s(t_k)]^T$ are the current control input $u(t_k)$, current brake-cylinder pressure $p(t_k)$, the previous brake torque $\tau(t_{k-1})$, and the current wheel-slip $s(t_k)$. The three modes of the hybrid system (7a & 7b) are the squeeze mode i=1, release mode i=2, and hold mode i=3. The regions $Y_i \subset \mathbb{R}^4$ that determine where each mode (squeeze, release, hold) is active are subsets of output-space $\mathbb{R}^4$ where the output of the closed-loop pneumatic brake system includes the brake controller input $u(t_k)$.

Figure 6:
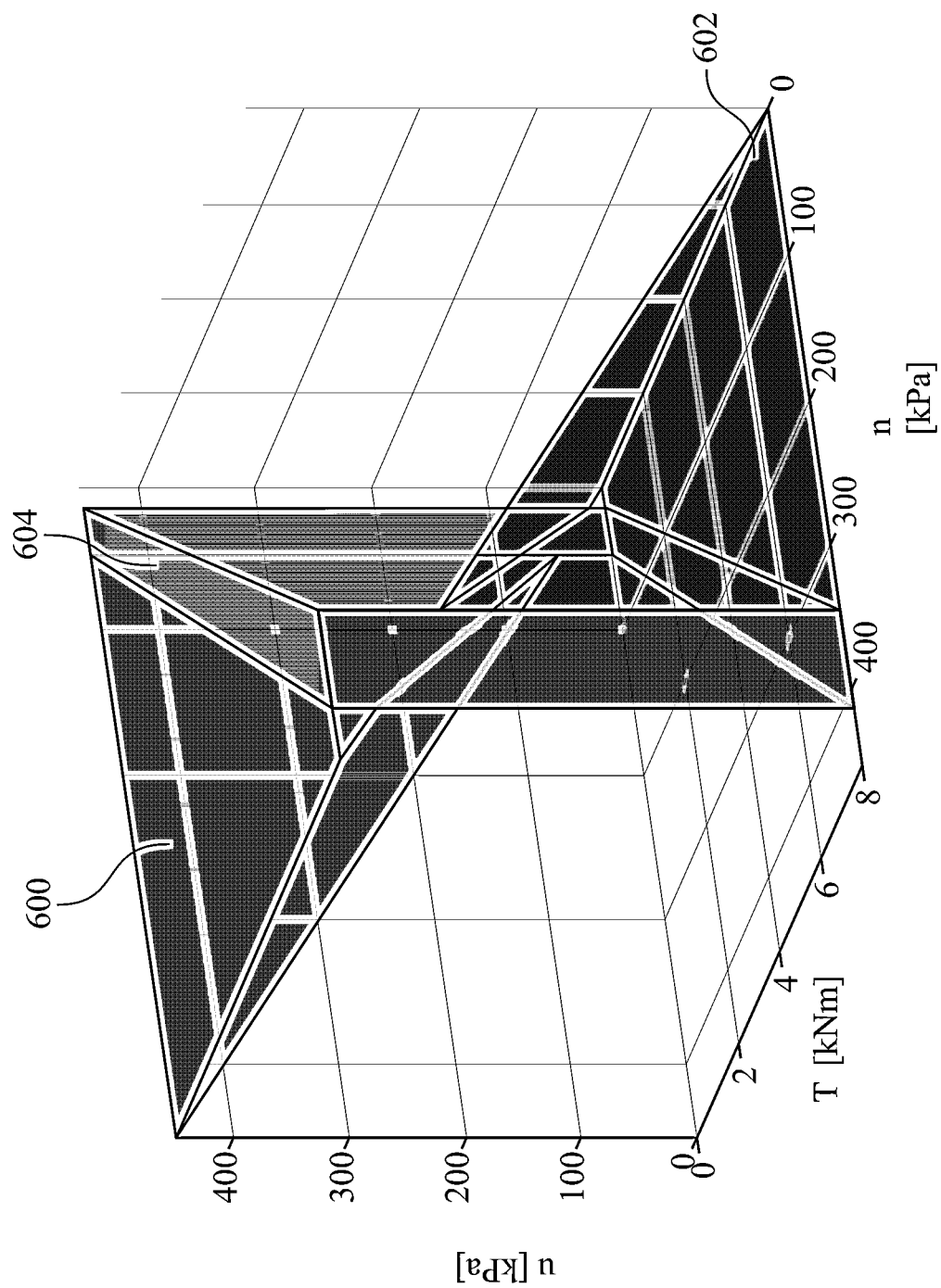
FIG. 6 shows projection of squeeze, release and hold regions in the pressure-torque-input space, according to some embodiments.

FIG. 6 shows projection of squeeze, release and hold regions in the pressure-torque-input space, according to some embodiments. The regions $Y_i$ are projected onto the pressure-torque-input space $[p(t_k), \tau(t_{k-1}), u(t_k)]$ are shown in in FIG. 6. The slip $s(t_k)$ is exempted in FIG. 6 as the regions $Y_i$ only includes simple bounds on the slip s(t) and do not have any constraints that couple slip with the other states or the input. In other words, the sets $Y_i$ are prismatic in the slip $s(t_k)$ direction.

The brake-cylinder pressure and the brake torque relationship for the squeeze region $Y_1 \subseteq Y$ is the same as described above with reference to FIG. 3C. Some embodiments are based on a recognition that squeeze region $Y_1$ 600 includes additional constraint $p(t_k) \leq u(t_k)$ requiring that the pressure $p(t_k)$ is not being vented. Likewise, in some embodiments, release region $Y_2$ 602 includes constraint that the brake-cylinder $p(t_k) \geq u(t_k)$ is not being filled. In equation (2), the hold region is defined as states not in the squeeze region $Y_1$ 600 or the release region $Y_2$ 602. From equation (2) it is clear that the resulting region $Y \setminus (Y_1 \cup Y_2)$ can be non-convex. In some embodiments, hold region $Y_3$ is defined as the entire region between the squeeze and release surfaces i.e.

$$Y_3 = \{x : \overline{\alpha}p + \overline{\beta} \leq \tau \leq \underline{\alpha}p + \underline{\beta}\}.$$

Set of Admissible References

The closed-loop dynamics of the pneumatic brake system defined by equation (7) is augmented with a constant $r(t_{k+1}) = r(t_k)$ reference $$\hat{x}^+ = \hat{f}_\varepsilon(\hat{x}) = \begin{cases} \hat{A}_1 \hat{x} + \hat{b}_1 & \text{if } \hat{x} \in \hat{X}_1 \\ \hat{A}_2 \hat{x} + \hat{b}_2 & \text{if } \hat{x} \in \hat{X}_2 \\ \hat{A}_3 \hat{x} + \hat{b}_3 & \text{if } \hat{x} \in \hat{X}_3 \end{cases} \quad (8)$$

where the augmented state $\hat{x}(t_k) = [x(t_k), r(t_k)]^T \in \mathbb{R}^{l_x+1}$ includes the closed-loop system (7) state $x(t_k) \in \mathbb{R}^{l_x}$ and the reference $r(t_k) \in \mathbb{R}^l$. The parameters are $$\hat{A}_i(\xi) = \begin{bmatrix} A_i(\xi) & B_i \\ O & I \end{bmatrix}, \hat{b}_i = \begin{bmatrix} b_i \\ 0 \end{bmatrix}, \text{ and}$$

$$\hat{X}_i = \left\{ \begin{bmatrix} x \\ r \end{bmatrix} : [CD] \begin{bmatrix} x \\ r \end{bmatrix} + d \in Y_i \right\}$$

for i=1; 2; 3. Further, the PI set is computed using the approach of iteratively backward propagating the system constraints (4) through the system dynamics (8).

$$\Omega^0 = \hat{X} \quad (9a)$$

$$\Omega^{k+1} = \bigcap_{\xi \in \{0,1\}} \hat{f}_\xi^{-1}(\Omega^k) \cap \hat{X} \quad (9b)$$

where $\hat{f}_\xi^{-1}$ is pre-image of the augmented dynamics (8) for $\xi = 0, 1$ and $\hat{X} = \{\hat{x} : Cx + Dr + d \in Y\}$ is the set of augmented states z corresponding to outputs y that satisfy the constraints (4). The maximal constraint admissible PI set $\mathcal{O} = \lim_{k \to \infty} \Omega^k$ is the limit of the iteration (9a & 9b).

The state-dependent set of admissible references $\mathcal{R}(x)$ is the set of constant references $r(t_{k+1}) = r(t_k)$ such that the closed-loop system (7a & 7b) satisfies constraints (4) for all future times i.e.

$$\mathcal{R}(x) = \left\{ r : \begin{bmatrix} x \\ r \end{bmatrix} \in \mathcal{O} \right\} \quad (10)$$

The iteration (9a & 9b) is complicated as the augmented brake dynamics (8) is nonlinear. The PWA dynamics and polyhedral constraints of the hybrid model (8) mean that the non-convex backward-reachable sets $\Omega_k$ can be expressed as a union of convex polyhedrons.

$$\Omega^0 = \cup_j \Omega_j^k \quad (11)$$

where $\Omega_j^k = \{\hat{x} : H^j \hat{x} \leq h^j\}$ is the j-th convex polyhedron defining the union $\Omega^k$. The backward propagation (9a & 9b) can thus be implemented by computing the pre-image of each component $\Omega_j^k$ of the set $\Omega_k$ under each mode i=1, 2, 3 of the dynamics (8). The new component sets $\Omega_{k+1}^j$ of $\Omega_{k+1}$ are polytopes given by $$\Omega_{k+1}^{j'} = \left( \hat{A}_i^{-1} \Omega_j^k - \hat{A}_i^{-1} \hat{b}_i \right) \cap X_i$$

$$= \left\{ \hat{x} : \begin{bmatrix} H^j \hat{A}_i \\ G_i \end{bmatrix} \hat{x} \leq \begin{bmatrix} h^j - H^j \hat{b}_i \\ g_i \end{bmatrix} \right\}$$

for j=1, . . . , J and i=1, 2, 3 where $\Omega_j^k = \{\hat{x} : H^j \hat{x} \leq h^j\}$ and $\hat{X} = \{\hat{x} : G_i \hat{x} \leq g_i\}$.

Figure 7A:
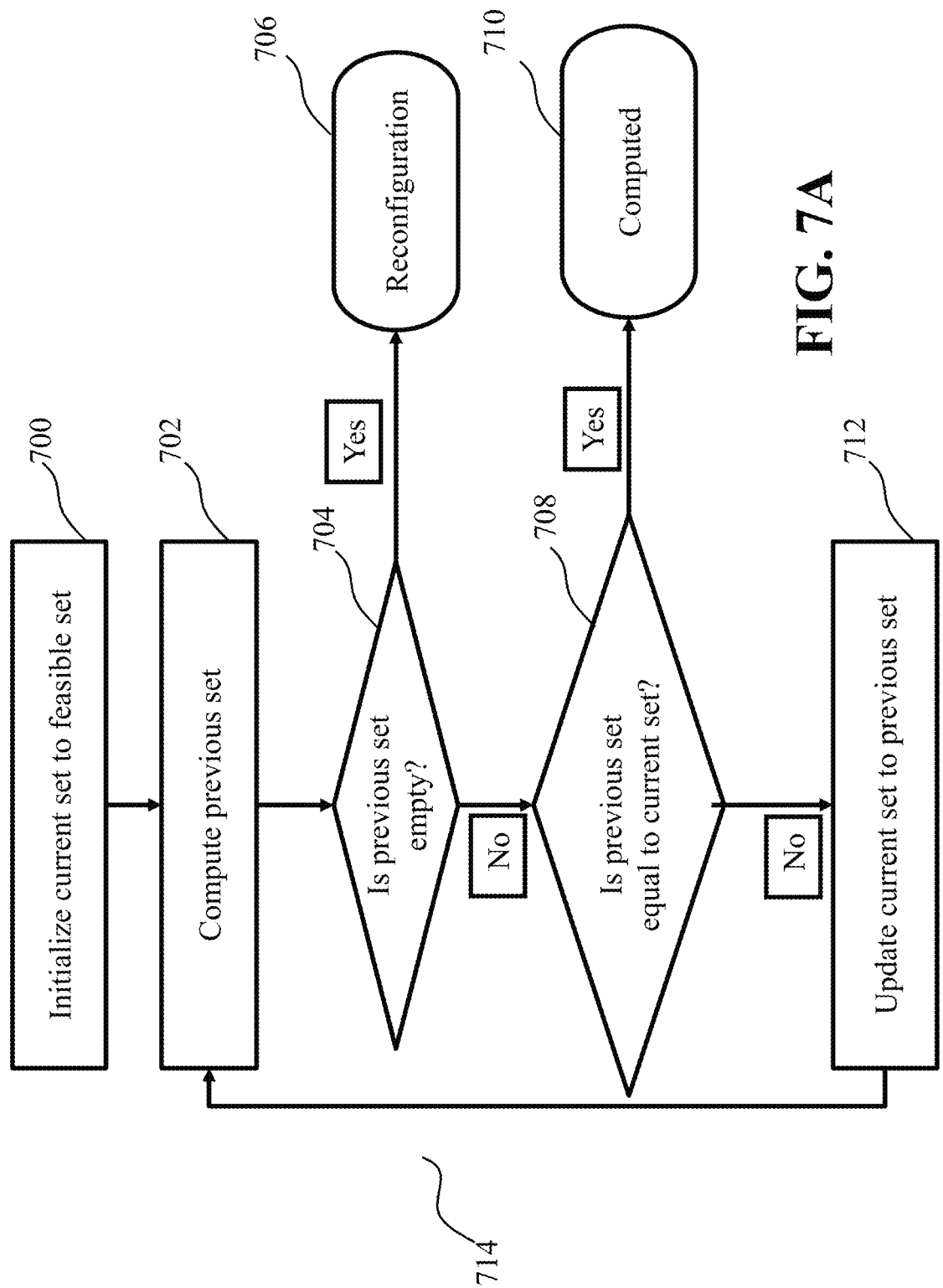
FIG. 7A is a block diagram of a backward-reachable set computation for determining the control invariant set according to some embodiments.

FIG. 7A is a block diagram of a backward-reachable set computation for determining the invariant set, according to some embodiments. The backward-reachable set computation determines a robust invariant subset $\mathcal{C}_x$ and also the invariant set $\mathcal{C}_u(x)$, which determines for any x within $\mathcal{C}_x$ the set of inputs u in $\mathcal{U}$ that can be applied so that all possible next states are inside $\mathcal{C}_x$.

The backward-reachable set computation initializes 700 a current set $\mathcal{X}_c$ to a feasible set $\mathcal{X}$ and determines a previous set of states $\mathcal{X}_p$ 702 as a subset of the current set $\mathcal{X}_c$ such that for all states x in $\mathcal{X}_p$ there exists an input u in $\mathcal{U}$ such that for all the possible values of the parameters p in P, the updated state is in the current set $\mathcal{X}_c$. The previous set also referred to as a backward reachable set.

If the previous set $\mathcal{X}_p$ is empty 704, correct operation of the controller cannot be guaranteed, and is further subjected to reconfiguration 706 which implies that the set P of possible values of the parameters should be reduced in size by changing the design or objective of the operation of the brake system. If the current set and the previous set are equal 708, that is the invariant set 710 otherwise, the previous set is assigned to be the current set 712 and the computation iterates 714 again.

In some embodiments, the iterations 714 are performed until a termination condition is met. In some embodiments, the termination condition specifies that a difference between the backward-reachable set and the current set is below a threshold. When the set $\mathcal{C}_x$ is found, the last computed set of state-input couples is the robust admissible input set $\mathcal{C}_u(x)$ for all x within $\mathcal{C}_x$.

FIG. 7B is a block diagram of an exemplar implementation of determining the previous set of states 702 according to one embodiment. The embodiment computes the state-input couple that generates an updated state that is in the current set for all the values of the parameters 702a, and projects 702b the state input couples into state values, i.e., the embodiment identifies the states that belong to at least one of such state-input couples.

When the stopping constraints are defined by the constraints in Equation (4), the computations of step 701a can be further simplified. In this case, the sets $\mathcal{X}$ and $\mathcal{U}$ are described by linear inequalities, and a set of linear models described by matrices $A_i$, $B_i$, i=1, . . . , l and $B_w$, and disturbance set $co(\{w_j\}_{j=1}^n)$ can be found such that for all x in $\mathcal{X}$, u in $\mathcal{U}$ $$f(x,u,p) \in co(\{A_i x(k) + B_i u(k)\}_{i=1}^l) \otimes B_w co(\{w_j\}_{j=1}^n) \quad (12)$$

for all p in P, where "co" denotes the convex hull and ⊗ denotes the set sum.

In some embodiments, the linear models in (12) can be computed, for instance, by taking the maximum and minimum of the parameters that form vector p allowed by P, and/or of their combinations. Further, equation (12) covers the case when all the parameters are perfectly known as in that case only one model is used $\mathcal{X}=1, \eta=1$.

Figure 8A:
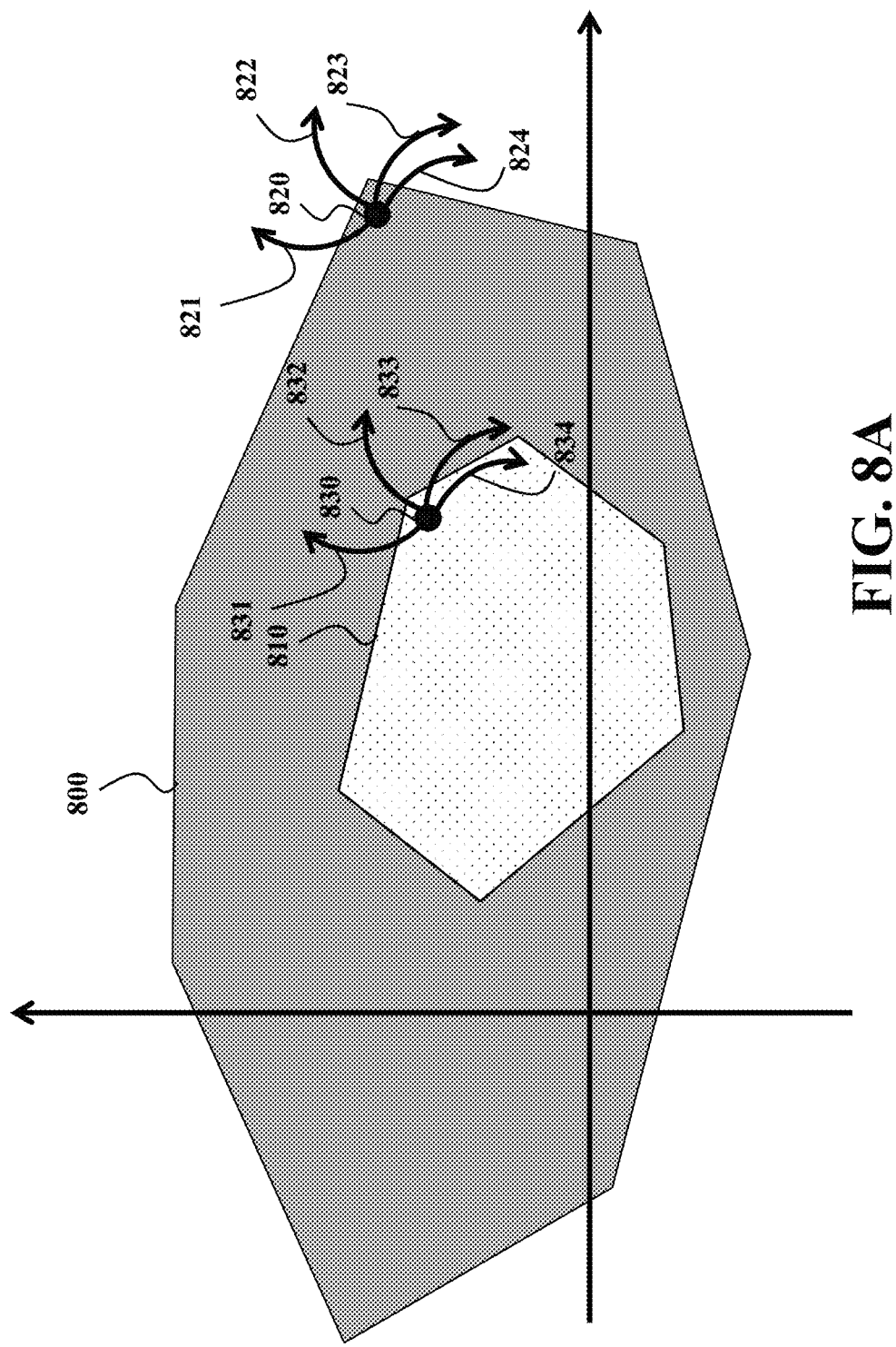
FIG. 8A is a schematic of an example of a two-dimensional projection of the control-invariant subset of states defined by various constraints on the operation of the pneumatic brake, according to some embodiments.

FIG. 8A is a schematic of an example of a two-dimensional projection of the invariant set of states defined by various constraints on the operation of the pneumatic brake system, according to some embodiments. Typically, a feasible region is a multi-dimensional polytope determined by hyperplanes, which are represented by linear inequalities, along multiple dimensions corresponding to the constraints on the operation.

In some embodiments, the values of the state variables of the pneumatic brake and the deceleration reference can be optimal and feasible for one iteration, but all control actions 821-824 that the brake controller is allowed to take during the next iteration, can bring a state 820 or the state variables of the pneumatic brake outside of the feasible region 800.

Some embodiments are based on a realization that it is possible to select a invariant set 810 of the feasible region, such that from any values of the state variables of the pneumatic brake within the invariant set 810, there is a control input maintaining the state variables within the invariant set for the known future state variables values of the pneumatic brake and the deceleration reference. For example, for any state such as a state 830 within the invariant set 810 and within all possible control inputs 831-834 that the brake controller can execute, there is at least one control input 834 that maintains the state variables values within the invariant set 810.

Figure 8B:
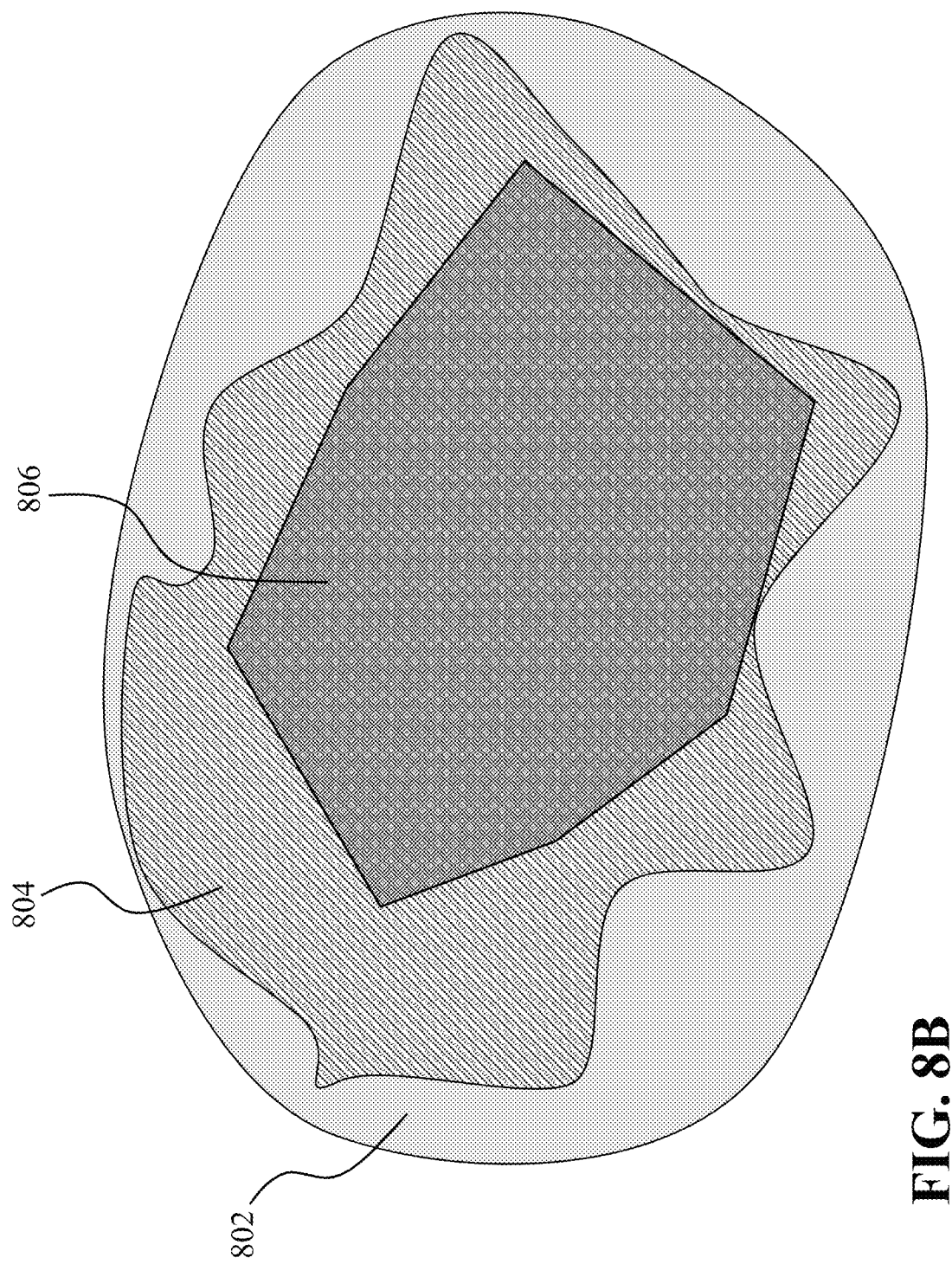
FIG. 8B is a schematic showing the relation between the feasible region of the states of the machine and control invariant subsets determined according to some embodiments.

FIG. 8B is a schematic showing the relation between a feasible region 802 and an invariant set 804 determined according to some embodiments. In some embodiments, the invariant set 804 is reduced to form control invariant set 806, which is less than the invariant set 804, but has a simpler shape formed by linear equations. As the invariant set 804 is determined by nonlinear equations, the shape of the invariant set 804 can be non-convex. Thus, computation of 806 is simpler, more efficient and advantageous for control purposes.

Figure 9A:
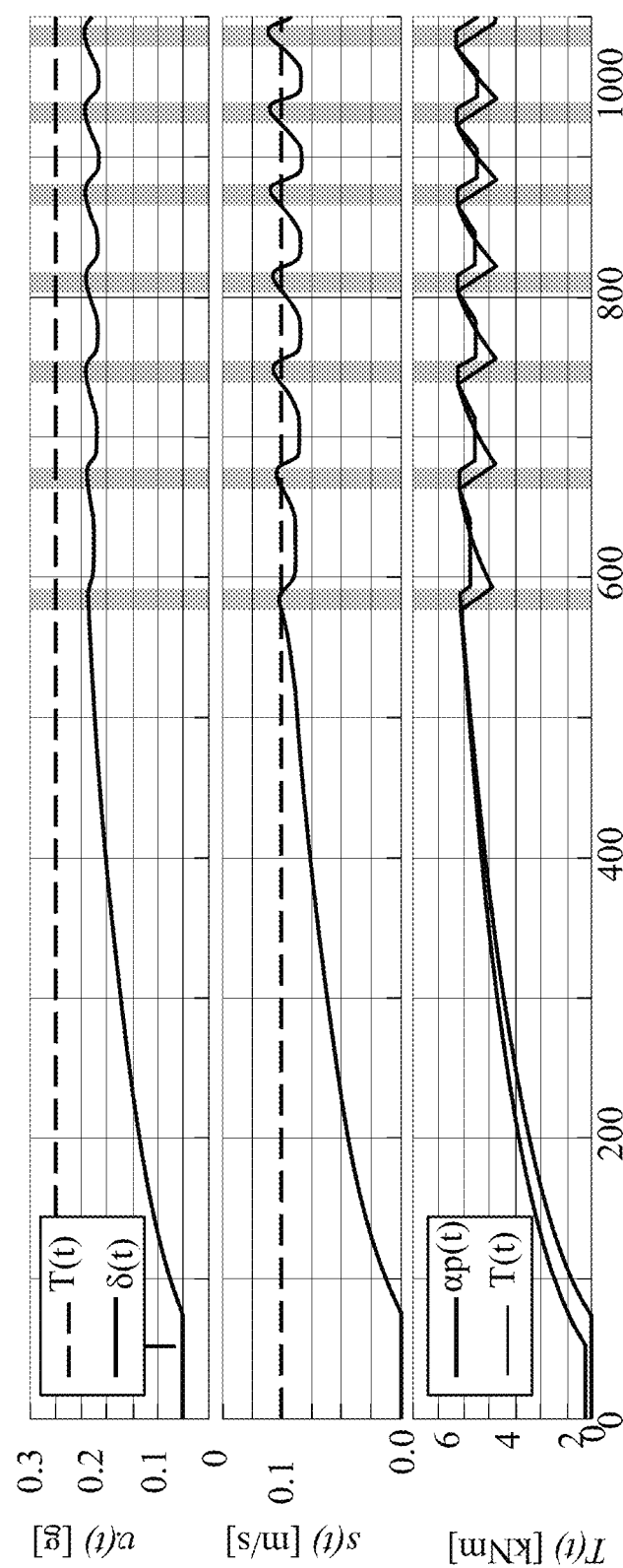
FIG. 9A shows simulations of the pneumatic brake system without the RG which produces undesirable cycling.

FIG. 9A shows simulations of the pneumatic brake system without the RG which produces undesirable cycling, according to some embodiments. Consider a scenario in which the peak wheel-rail friction $f_{max}$=0.2 Mg is too low to achieve desired deceleration reference $r^0(t)$=0.25 g. Without the RG, the wheel-slip s(t) exceeds the stable-slip threshold s(t)>0.1 causing the brake controller to enter the slip protection mode which produces the undesirable oscillatory behavior as shown in FIG. 9A.

In the slip protection mode, the brake-cylinder pressure p(t) is quickly vented to reduce brake torque τ(t) and restore the slip s(t) to the stable-slip region s(t) 0.1. This results in increased deceleration tracking error e(t). Even after the slip protection mode is disengaged and the tracking controller is re-engaged, the undesirable behavior persists. Further, the tracking controller requires approximately 100 milliseconds to overcome the brake hysteresis and then another approximately 400 milliseconds to achieve the previous deceleration peak, at which point the wheel-slip s(t) again exceeds the threshold s(t)>0.1 and the slip protection mode is again engaged. The resulting limit cycle instigates relatively large average deceleration tracking error.

Figure 9B:
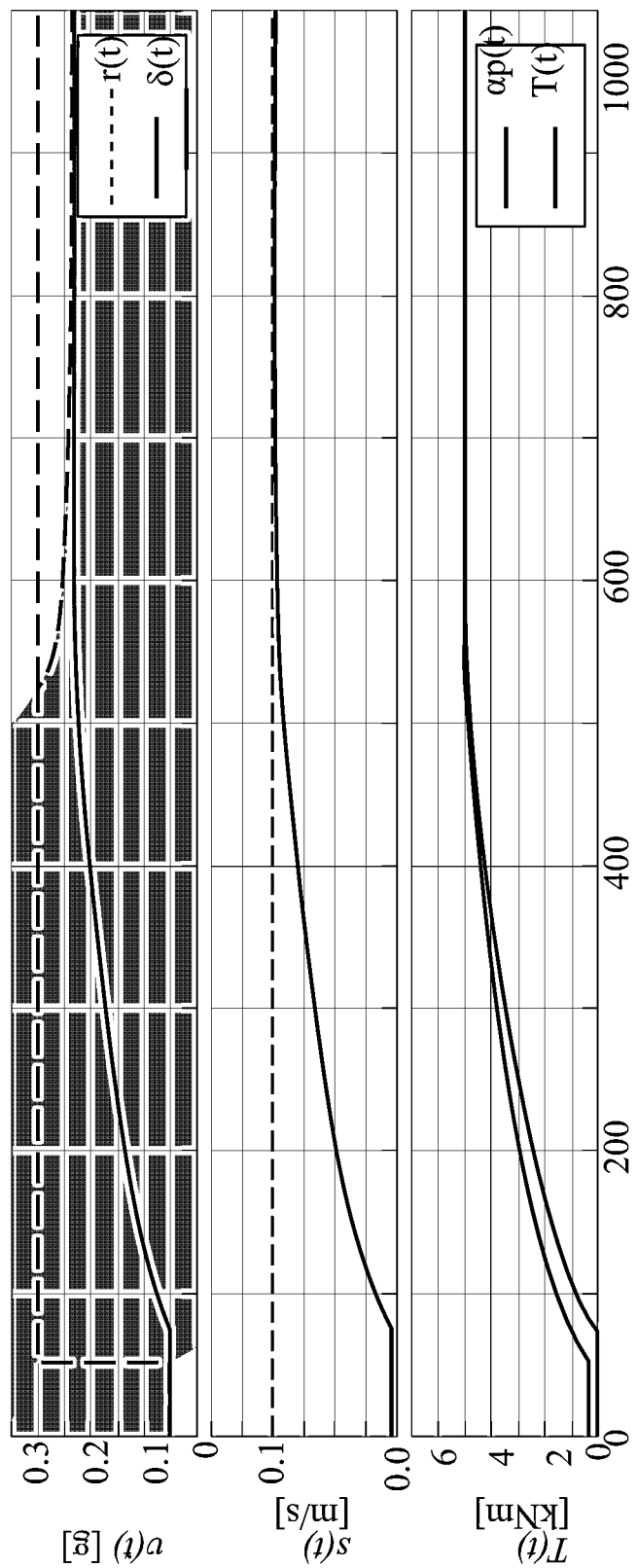
FIG. 9B shows simulations of the pneumatic brake system with the RG showing elimination of the cycling, according to some embodiments.

FIG. 9B shows simulations of the pneumatic brake system with the RG showing elimination of the cycling, according to some embodiments. FIGS. 9A and 9B correspond to simulation results with an infeasible deceleration reference without using the RG and with using RG, respectively. As the slip s(t) approaches the boundary of the stable-slip region, the RG lowers the infeasible deceleration reference $r^0(t)$=0.25 g to an achievable reference r(t)≈0.2 g. This results in a non-zero steady-state tracking error $\lim_{t\to\infty} r^0(t)-\dot{v}(t)$≈0.0682 g which is lower than the average tracking error that results without the RG.

Some embodiments are based on a realization that a small improvement in deceleration tracking can lead to a significant improvement in stopping accuracy as position error is proportional to double-integral of deceleration error. For example, over a 30 seconds braking maneuver, the RG improves the stopping accuracy by 1.62 meters. Additionally, smoother deceleration profile (FIG. 9B) is produced by the RG which results less jerk than the slip protection mode or WSP system (FIG. 9A), resulting in a comfortable ride for the passengers and reduced wear on the braking mechanism.

Figure 10A:
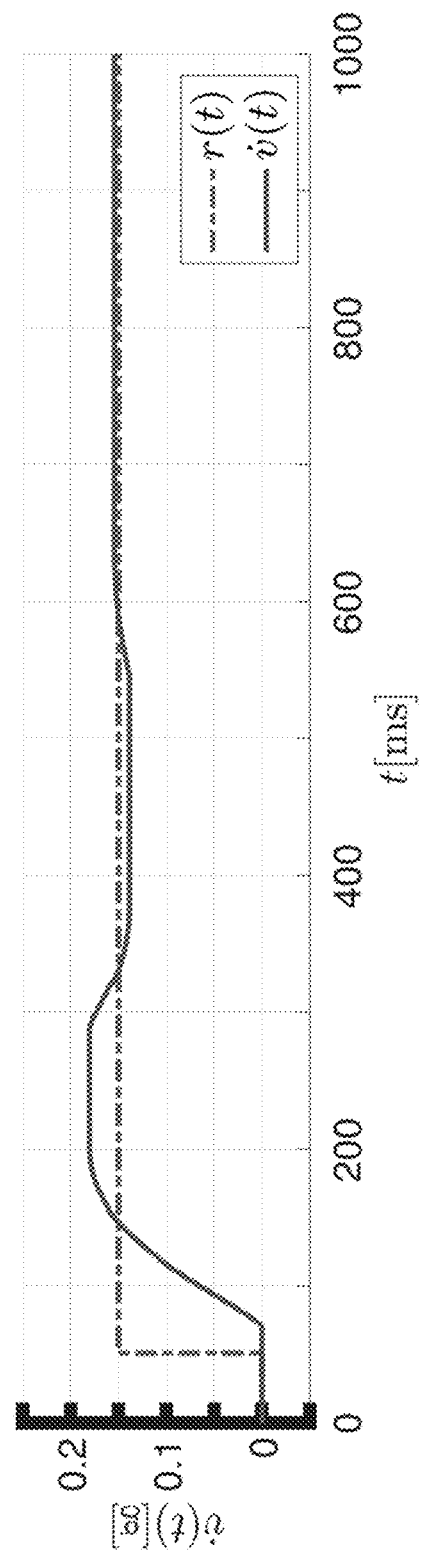
FIG. 10A shows simulations of the pneumatic brake system without the RG resulting in overshooting and cycling caused by aggressive integral-action.

FIG. 10A shows simulations of the pneumatic brake system without the RG which results in overshooting and cycling caused by aggressive integral-action, according to some embodiments. The aggressiveness of the proportional-integral controller is fundamentally limited by the brake hysteresis and adhesion-curve nonlinearity. In some embodiments, aggressive integral-action can cause overshoot and windup. Both of these issues are aggravated by plant non-linearity. The overshoot can cause the slip-speed to enter the unstable-slip region even when the steady-state deceleration set-point is feasible. A delay is caused by the hysteresis, namely, hysteresis delay. According to some embodiments, the hysteresis delay implies that the closed-loop brake system 100 should include a large phase margin which limits the aggressiveness of the tracking controller.

The closed-loop response of the braking system to a feasible deceleration command is depicted in the FIG. 10A. The more aggressive controller settles approximately three times faster than the previous controller shown in FIGS. 9A and 9B. Since each oscillation needs to pass through the hold zone (FIGS. 3B & 3C), the oscillations produced by the integral-action prevent even faster convergence. In addition, the closed-loop response shown in FIG. 10A includes a small overshoot which can pose as a problem near the boundary of the stable-slip region. The RG mitigates these issues allowing use of the more aggressive controller.

Figure 10B:
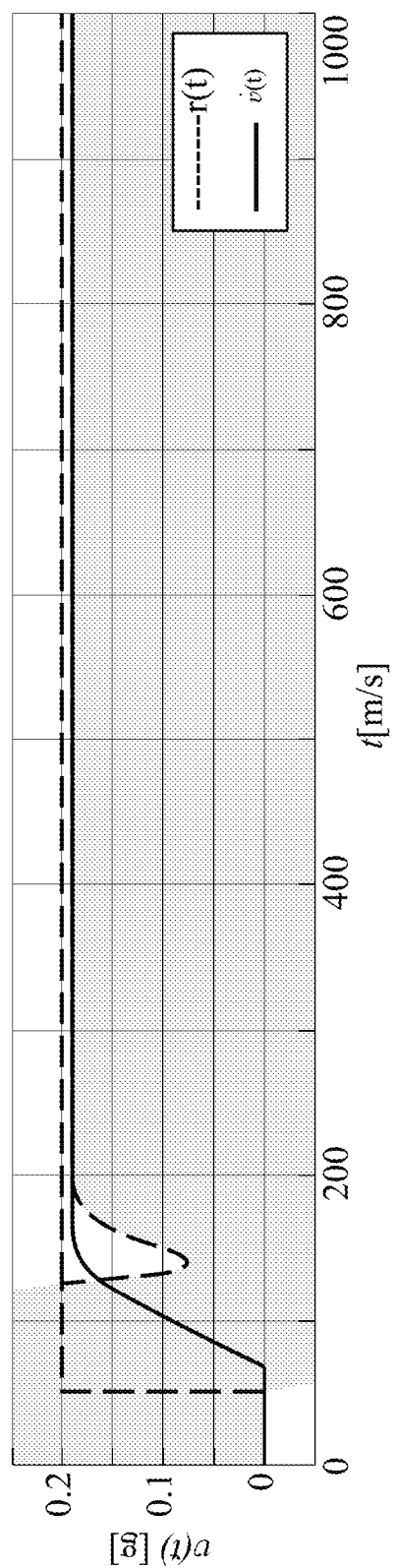
FIG. 10B shows simulations of the pneumatic brake system with the RG showing inherent anti-windup, according to some embodiments.

FIG. 10B shows simulations of the pneumatic brake system with the RG showing inherent anti-windup, according to some embodiments. The closed-loop response of the braking system with RG to a deceleration command on the boundary of the stable-slip region is shown in FIG. 10B. As the deceleration $\dot{v}(t)$ approaches the deceleration reference $r^0(t)$, the RG decreases the reference r(t). This unwinds the integrator in the brake controller and, consequently, the slip-speed remains in the stable region. Additionally, the oscillations are substantially attenuated allowing the deceleration to converge more quickly to the deceleration reference. Furthermore, the RG essentially produces non-linear integral-action that includes beneficial properties, such as fast transient response and offset-free tracking without the disadvantage of poor robustness to model uncertainty and the delays.

Figure 11:
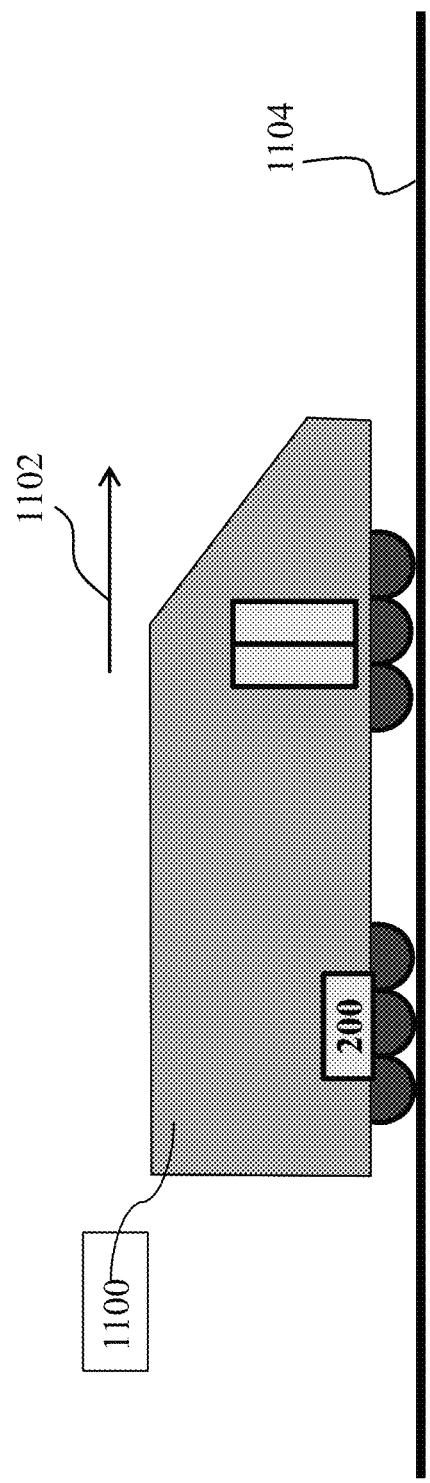
FIG. 11 shows a schematic of a railway vehicle using the control system of FIG. 2A to prevent the wheel-slip in a train, according to some embodiments.

FIG. 11 shows a schematic of a train system using the control system 200 according to some embodiments to prevent the wheel-slip in a train 1100 moving on the railroad track 1104 along the direction 1102. In this embodiment, the train 1100 includes pneumatic brake system (not shown in figure) to decelerate or stop the train. The control system 200 is integrated with the pneumatic brake system. Whenever brake is applied causing excessive slip, the control system encompasses the reference governor that prevents the excessive slip by modifying the deceleration reference. Further, since the control system 200 eliminates the excessive slip, jerks instigated by the applied brake are eliminated as well. This results in smooth deceleration or stopping which further enhances the passengers ride comfort while the brake is applied.

Some embodiments are based on recognition that the concept of invariant sets can be used to improve stopping accuracy of the train. It is challenging to consider dynamics of the brake dynamics due to the vast differences in spatial (kilometers vs. micrometers) and temporal (minutes vs. milliseconds) scales. Nonetheless, some implementations of embodiments merge the invariant sets determined for accurate stopping and for breaking to compute a single multi-purpose invariant set.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, if understood by one of ordinary skill in the art, the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A control system for wheel-slip prevention in a railway vehicle with a pneumatic brake, comprising:
    an input interface configured to accept a deceleration reference for controlling the pneumatic brake;
    a memory configured to store a reference governor providing executable instructions for modifying the deceleration reference upon violation of a wheel-slip constraint, and configured to store a controller providing executable instructions for mapping the modified deceleration reference to a sequence of control commands for controlling pressure applied by the pneumatic brake;
    a processor configured to execute the reference governor to modify the deceleration reference and configured to execute the controller to map the modified deceleration reference to the sequence of control commands, wherein the memory is further configured to store an invariant set of combination of the deceleration reference and values of the state variables of the pneumatic brake, and wherein the reference governor predicts future violation of the wheel-slip constraint when current values of the state variables of the pneumatic brake and the deceleration reference are outside of the invariant set; and
    an output interface configured to output the sequence of control commands to control the pneumatic brake.

2. A train including the control system of claim 1, wherein the deceleration reference is generated in response to actions of a railway operator.

3. The control system of claim 1 integrated with the pneumatic brake, the pneumatic brake comprising:
    a reservoir storing compressed air,
    a brake-cylinder filled from the reservoir to apply a braking torque to a wheel of the railway vehicle in proportion to pressure in the brake cylinder; and
    a valve arranged between the reservoir and the brake-cylinder to regulate the pressure in the brake-cylinder in accordance with the sequence of control commands.

4. The control system of claim 1, wherein the wheel-slip constraint is a function of state variables of the pneumatic brake.

5. The control system of claim 1, wherein the reference governor modifies the current value of the deceleration reference that is outside of the invariant set, to its closest value inside the invariant set.

6. The control system of claim 1, wherein the state variables of the pneumatic brake include one or more of a braking torque to a wheel of the railway vehicle, pressure in a brake-cylinder of the pneumatic brake, and a slip of the wheel.

7. The control system of claim 1, wherein the invariant set is a constraint admissible positive invariant set of values of the state variables of the pneumatic brake and the deceleration reference for which the wheel-slip is maintained below a prescribed level.

8. The control system of claim 1, wherein the invariant set is determined using a backward reachable method, wherein the backward reachable method comprises determining iteratively the invariant set starting from a current set of feasible states of the pneumatic brake and the deceleration reference, until a termination condition is met, wherein each iteration comprises:
 determining the backward-reachable set of the current set such that for each state and reference pair within the backward-reachable set, the respective state is within the current set; and
 replacing the current set with the backward-reachable set.

9. The control system of claim 8, wherein the termination condition specifies that a difference between the backward-reachable set and the current set is less than or equal to a threshold.

10. The control system of claim 8, wherein the invariant set is determined as a non-convex constraint admissible positive invariant set represented by a union of convex polytopes.

11. The control system of claim 8, wherein dynamics of the pneumatic brake comprise hysteresis forcing non-convexity of the invariant set.

12. The control system of claim 11, wherein the dynamics of the pneumatic brake are modeled by a hybrid-model comprising a plurality of behavior models, wherein each model of the plurality of behavior models provides different behaviors of the pneumatic brake and regions of state-space where the behaviors of the pneumatic brake occur.

13. The control system of claim 12, wherein the plurality of behavior models comprises:
 a squeeze model that describes the behavior of the pneumatic brake in a squeezed state of the brake cylinder;
 a release model that describes the behavior of the pneumatic brake in a release state of the brake cylinder; and
 a hold model that describes the behavior of the pneumatic brake in a hold state of the brake cylinder.

14. The control system of claim 8,
 wherein the current set of feasible states comprises a union of polyhedral sets,
 wherein the backward-reachable set of the current set is computed by computing the backward-reach sets of each polyhedral set that comprises the current set, and
 wherein the backward-reachable set of each polyhedral set is computed by computing the backward-reachable set for each model in a hybrid-model defining dynamics of the pneumatic brake and intersecting the states with the states where the model is active.

15. A method for preventing wheel-slip in a railway vehicle with a pneumatic brake, wherein the method uses a processor coupled to a memory storing a reference governor that provides executable instructions for modifying a deceleration reference upon violation of a wheel-slip constraint, and a controller providing executable instructions for mapping the modified deceleration reference to a sequence of control commands for controlling pressure applied by the pneumatic brake, wherein the memory is further configured to store an invariant set of combination of the deceleration reference and values of the state variables of the pneumatic brake, and wherein the reference governor predicts future violation of the wheel-slip constraint when current values of the state variables of the pneumatic brake and the deceleration reference are outside of the invariant set, wherein the processor is coupled with stored instructions which when executed by the processor carry out steps of the method, the steps comprising:
 accepting a deceleration reference for controlling the pneumatic brake;
 modifying the deceleration reference and mapping the modified deceleration reference to the sequence of control commands; and
 outputting the sequence of control commands to control the pneumatic brake.

16. The method of claim 15, wherein a control command is determined for a control step, such that the sequence of control commands is determined for a sequence of control steps, and wherein the processor executes the reference governor for each of the control steps to adapt the control of the pneumatic brake to changes of the wheel-slip even after the wheel-slip is detected.

* * * * *